United States Patent [19]
Handke et al.

[11] Patent Number: 5,353,898
[45] Date of Patent: Oct. 11, 1994

[54] VIBRATION DAMPER UNIT

[75] Inventors: Günther Handke, Euerbach; Rolf Wengenroth, Schweinfurt; Günther Braun, Geldersheim; Helmut Baalmann, Bergrheinfeld, all of Fed. Rep. of Germany

[73] Assignee: Fichtel & Sachs AG, Schweinfurt, Fed. Rep. of Germany

[21] Appl. No.: 909,072

[22] Filed: Jul. 2, 1992

[30] Foreign Application Priority Data

Jul. 5, 1991 [DE] Fed. Rep. of Germany ... 9108291[U]
May 14, 1992 [DE] Fed. Rep. of Germany ... 9206586[U]

[51] Int. Cl.$^5$ .............................. F16F 9/46
[52] U.S. Cl. ..................... 188/294; 188/318; 188/322.19
[58] Field of Search ........... 188/318, 299, 315, 322.13, 188/322.19

[56] References Cited

U.S. PATENT DOCUMENTS

| 1,552,407 | 9/1925 | Almesan | 188/318 X |
|---|---|---|---|
| 2,500,708 | 3/1950 | Rossman | 188/315 |
| 2,695,079 | 11/1954 | Brundrett | 188/315 |
| 3,966,030 | 6/1976 | Sirven | 188/315 |
| 4,802,561 | 2/1989 | Knecht et al. | 188/299 X |
| 4,850,460 | 7/1989 | Knecht et al. | 188/315 X |

FOREIGN PATENT DOCUMENTS

| 3535287 | 4/1987 | Fed. Rep. of Germany . | |
|---|---|---|---|
| 3807913 | 2/1989 | Fed. Rep. of Germany | 188/299 |
| 4007180 | 9/1991 | Fed. Rep. of Germany | 188/318 |
| 4101887 | 5/1992 | Fed. Rep. of Germany . | |
| 4041829 | 7/1992 | Fed. Rep. of Germany . | |
| 166739 | 9/1984 | Japan | 188/299 |
| 117737 | 5/1991 | Japan | 188/299 |

Primary Examiner—Robert J. Oberleitner
Assistant Examiner—Lee W. Young
Attorney, Agent, or Firm—Brumbaugh, Graves, Donohue & Raymond

[57] ABSTRACT

In a vibration damper for a motor vehicle a flow path connecting a working chamber of the cylinder with a damping behavior control unit is confined by a flow path tube surrounding the cylinder. The flow path tube is provided adjacent its axial end portions with bead-shaped grooves accommodating respective sealing rings. These sealing rings are according to an illustrated example of the invention in engagement with an external surface of the cylinder. The bead-shaped grooves are obtained by non-cutting machining.

48 Claims, 13 Drawing Sheets

VIBRATION DAMPER UNIT

BACKGROUND OF THE INVENTION

This invention relates to a vibration damper unit the damping behavior of which is variable through at least one damping control unit.

Vibration dampers with variable damping effect have increasing importance. Accordingly, the production numbers of such vibration dampers also increase. Accordingly, the production of vibration dampers with adjustable damping effect must be optimized with respect to production steps and with respect to the production costs.

With such vibration damper units, the flow path containing a damping behavior control unit is relatively difficult and relatively expensive to be made.

STATEMENT OF THE PRIOR ART

In German patent publication 41 04 110, a flow path tube unit has been described which consists of a plurality of components which are soldered with respect to each other. Additionally, machining on swarf-cutting machines is required. Consequently, high manufacturing costs arise, while reliability of production of the welded or soldered connections has not yet been fully cared for. Deserving improvement is also the connection between a transverse joint tube and the damping behavior control unit. This connection must be of very high quality in order to warrant the necessary sealing function.

Similar problems arise with the construction according to FIG. 1 of the German patent publication 35 35 287C2. With this embodiment, the flow path tube is shaped as a unit. Less satisfactory with this construction is the sealing between the flow path tube and the cylinder. One seals here without additional sealing means. This means that one has either to use a pressure tit or a welding connection between the cylinder and the flow path tube. Besides the difference of manufacturing, this kind of connection results in a deformation of the cylinder and thereby a deformation of the face on which the piston slides. It is, therefore, necessary to introduce an additional working step with respect to the cylinder, which is difficult in mass production.

OBJECT OF THE INVENTION

It is an object of the present invention to provide a vibration damper unit which can be manufactured more easily and at lower costs.

More particularly, it is intended to reduce the difficulties and costs in manufacturing the flow path tube and in sealing the flow path tube with respect to further components of the vibration damper. Further, it is intended to improve the connection between the flow path tube and a damping behavior control unit to be adjoined to the flow path tube.

SUMMARY OF THE INVENTION

A vibration damper unit is provided the damping behavior of which is variable through at least one damping behavior control unit. Said vibration damper unit comprises a cylinder member having an axis and two ends and defines a cavity therein. A piston rod member is sealingly guided through at least one of the two ends. Accordingly, a piston rod guiding and sealing unit is provided adjacent said at least one of the two ends. A bottom unit is provided adjacent the other one of the two ends. This bottom unit may be integral with another component or may be a separate component. A piston unit is combined with the piston rod member within the cavity. A plurality of spaces is provided inside and outside the cavity. A damping fluid is provided within at least part of these spaces. Flow path defining means define flow paths interconnecting respective spaces. At least part of the spaces may be used for defining the flow paths. At least one of the flow paths contains said at least one damping behavior control unit. The flow path defining means include a flow path defining flow path tube unit. This flow path tube unit surrounds the cylinder member and cooperates with the cylinder member to define radially between the cylinder member and the flow path tube unit a fluid flow chamber. This flow path tube unit has axially spaced flow path tube end portions. Moreover, the flow path tube unit has at least one transverse joint tube member extending substantially radially outwards from the flow path tube unit and is adjoined to or adapted for being adjoined to the at least one damping behavior control unit. At least one flow path tube end portion comprises a sealing means receiving groove. This sealing means receiving groove accommodates annular sealing means for substantially sealing the fluid flow chamber.

The sealing means receiving groove may be non-cuttingly shaped into an internal or external surface of the flow path tube unit. Preferably, the groove is open in radially inwards direction such that the sealing means received therein are engageable with an external engagement face. This engagement face may be provided on the cylinder member or on the piston rod guiding and sealing unit or on the bottom unit. In case of sealing the flow path tube unit with respect to one of the piston rod guiding and sealing unit and the bottom unit, it is also possible that the sealing means receiving groove is open in a radially outwards direction such that the sealing means engage with an internal engagement face of the piston rod guiding and sealing unit or the bottom unit. The groove may be shaped as a bead by non-swarf-cutting machining, in accordance with usual manufacturing methods applied to thin-walled materials, such as sheet metal and thin-walled tube material. Such, the manufacturing of the flow path tube unit is considerably simplified and more economic as compared with the above described older methods. Particularly when using thin-walled flow path tubes, the groove to be manufactured on one side of the tube results in a corresponding annular rib on the other side of the tube material. The end portion of the flow path tube unit may be reduced in diameter, such as to engage a respective external engagement face and, nevertheless, provide a fluid flow chamber of sufficient cross-section. This is particularly true, when the respective end portion is to be engaged with the cylinder member itself. In cases in which the flow path tube unit is to be engaged with an external engagement face of the piston rod guiding and sealing unit or of a bottom unit, diameter reduction may be unnecessary by dimensioning the engagement face of the respective piston rod sealing and guiding unit or bottom unit, such as to provide a sufficient radial dimension of the fluid flow chamber. In such case, it is sufficient to simply bead the respective end portion of the flow path tube unit for obtaining the groove as desired. The groove to be obtained by beading may be confined by two side walls in axial direction. It is, however, also possible to provide a groove which is open in one axial direction. In case of a groove which is confined by two side faces in axial direction, the sealing means can be more reliably positioned within the groove, both during assembly and during operation.

The at least one flow path tube end portion may be axially movable with respect to the cylinder member. This is particularly true, when the sealing means are axially located with respect to the respective flow path end portion in both axial directions.

Preferably, both tube end portions comprise a respective sealing means receiving groove, both said sealing means receiving grooves accommodating respective annular sealing means.

The transverse joint tube member may be integral with a longitudinal section of the flow path tube unit. This transverse joint tube member may be in such case formed by usual sheet metal shaping methods from the material of the respective section of the flow path tube unit.

The flow path tube unit may be substantially integral along its total length between the axially spaced flow path tube end portions. This embodiment is most simple in manufacturing and can be used particularly in the production of large series.

It is possible also that the flow path tube unit comprises a plurality of at least two axially subsequent flow path tube sections.

By combining a flow path tube unit from a plurality of separate axially subsequent flow path tube sections it becomes possible to provide flow path tube units of various dimensions and shapes with a relatively small number of componental sections. One can regard the various sections as modules to be combined in various ways.

At least part of the flow path tube sections may be rotatable with respect to a respective adjacent flow path tube section about the axis. For combining mutually adjacent flow path tube sections of a flow path tube unit axially overlapping connecting portions may be used. At least one of the axially overlapping connecting portions may be provided with a sealing means receiving groove open in radial direction towards the other one of the axially overlapping connecting portion. This sealing means receiving groove accommodates the respective annular sealing means.

Again, the sealing means receiving groove may be obtained by beading, i.e. by a method of non-swarf-cutting shaping technique according to a usual method used for shaping thin-walled tube members, particularly metallic tube members. Such, there exist again corresponding annular ribs on the side of the tube unit remote from the groove side.

The sealing means receiving groove is preferably provided by a radially outer one of the axially overlapping connecting portions and open in radial direction towards an inner one of the axially overlapping connecting portions.

The mutually overlapping connecting portions may be provided with respective abutment means defining a position of maximum overlapping. Such, the assembly work is facilitated.

The mutually overlapping connecting portions may be telescopically movable with respect to each other in axial direction. Such adaptation to varying dimensions of the components is possible.

Abutment means may be provided by a terminal edge of one of the axially overlapping connecting portions and a transition shoulder provided adjacent the other one of the axially overlapping connecting portions. The transition shoulder may be again obtained by usual non-cutting treatment techniques for thin-walled tube material.

The axially overlapping connecting portions may be in mutual thread engagement. Such, the axial position of the respective sections is fixable with varying overlapping length. One of the sections may be a connecting sleeve overlapping two mutually adjacent sections. The threads may be obtained by non-cutting machining. The flow path tube unit may be provided with a plurality of at least two transverse joint tube members.

In particular, at least two of the flow path tube sections which are rotatable with respect to each other may be provided with at least one respective transverse joint tube member. Such, one can position the transverse tube members of different flow path tube sections in desired angular positions with respect to each other in accordance with the space available for accommodating respective damping behavior control units.

The flow path tube unit may comprise two terminal flow path tube sections and one intermediate flow path tube section axially therebetween, these three sections being provided by separate components.

The flow path tube unit may have two terminal flow path tube sections and a middle flow path tube section therebetween. In this case, one of the terminal flow path tube sections may be sealed with respect to an external engagement face of one of the cylinder member and the piston rod guiding and sealing unit, and the other terminal flow path tube section may be sealed with respect to one of the cylinder member and the bottom unit. The middle section may have a larger internal diameter than the terminal sections, such as to provide the required radial width of the fluid flow chamber.

It is to be stated once more that the flow path tube unit, irrespective of being integral or being composed of a plurality of separate sections, may be alternatively sealed by its end portions on the cylinder member or on the piston rod guiding and sealing unit and the bottom unit. According to a further alternative, one of the end portion may be engaged with the cylinder member and the other end portion may be sealingly engaged with the piston rod guiding and sealing unit or the bottom unit. It is even possible that the flow path tube unit is exclusively centered and sealed with respect to the piston rod sealing and guiding unit and the bottom unit without any engagement with the cylinder member.

The internal diameter of the terminal sections is preferably substantially equal.

The flow path tube unit is preferably substantially concentric with respect to the cylinder member.

The annular sealing means of the at least one flow path tube end portion may comprise at least one O-ring member of usual sealing material.

Also the sealing means provided between subsequent sections of the flow path tube unit may comprise one or a plurality of such O-ring members.

The transverse connecting tube member may be of such length as to be engaged or engageable with longitudinal overlapping with an engagement face of an adjoining member of the damping behavior control unit. Such the connection between the damping behavior control unit and the flow path tube unit can be also facilitated. The adjoining member of the damping behavior control unit may be a valve seat member if the damping behavior control unit is provided with a valve.

This is a most normal solution. It is to be noted, however, that the behavior control unit may also be a throttling unit, the flow resistance of which may be continuously or stepwise variable.

The engagement face of the adjoining member of the damping behavior control unit may be an internal or external engagement face having an adapted diameter. Preferably the engagement face of the adjoining member is an external engagement face having a diameter substantially equal to an internal engagement face of the transverse joint tube member.

Sealing means may be provided between the transverse joint tube member and the adjoining member of the damping behavior control unit. These sealing means may be accommodated by an annular groove of one of said engagement face of said adjoining member and said transverse joint tube member. In case of the annular groove being provided in the transverse joint tube member this groove may be again obtained by non-cutting machining methods such as beading.

As mentioned above, the transverse joint tube member may be integral with at least a section of the flow path tube unit. In this case an integral transition zone may be provided between the respective section of the flow path tube unit and the transverse joint tube member. This transition zone may be lowered radially inwards with respect to an adjacent outer circumferential surface of the respective section of the flow path tube unit. By this lowering a smooth transition is possible and the risk of fissures is considerably reduced. Moreover, the lowering of the transition allows to provide a relatively long straight section of the joint tube member which can be easily overlapped with a respective part of the behavior control unit without increasing the total cross-sectional dimension of the vibration damper unit. As a result thereof, the sealing means provided between the transverse joint tube member and the adjoining part of the behavior control unit can be made longer along the axis of the transverse joint tube member. Moreover, the construction is less sensitive to axial dislocation of said sealing means.

The transition zone may have a radially innermost internal surface portion opposite to the axis and the radial distance of the radially innermost internal surface portion from the axis may be equal or slightly larger than an internal radius of the flow path tube unit adjacent a respective flow path tube end portion.

The transition zone may follow, when regarded in a plane of section containing an axis of the transverse joint tube member, a curve having a radius, said radius corresponding to a multiple of the wall thickness of the flow path tube unit adjacent the location of the respective transverse joint tube member. For example, the radius of curvature may be at least three times, preferably at least five times, the wall thickness.

The vibration damper unit may further comprise a container member surrounding the cylinder member and the flow path tube unit such that an annular chamber is provided radially between the cylinder member and the container member radially outside of the flow path tube unit. In this case the flow path containing the at least one damping behavior control unit may extend from the cavity through the fluid flow chamber and the damping behavior control unit towards the annular chamber. The direction of flow is freely selectable. Preferably the direction of flow is, however, such that the damping fluid flows from the cavity through the fluid flow chamber and through the damping behavior control unit towards the annular chamber.

In accordance with the usual design of double tube vibration damper units the cavity may be subdivided by the piston unit into two working chambers, a first working chamber adjacent the piston rod guiding and sealing unit and a second working chamber adjacent the bottom unit. The first and the second working chambers may be interconnected by first valve means allocated to the piston unit. The second working chamber may be interconnected with the annular chamber by second valve means allocated to the bottom unit. The first working chamber and the second working chamber may be substantially filled with a damping liquid. The annular chamber may be partially filled with the damping liquid and partially filled with gas. The first working chamber may be connected with the fluid flow chamber and the fluid flow chamber may be connected with first connection means of the damping behavior control unit, whereas second connection means of the damping behavior control unit may be connected with the annular chamber.

The damping behavior control unit may be fastened to the container member, if such container member is provided. The damping behavior control unit may be as mentioned above in the form of shut-off valve means or throttling means of variable flow resistance.

Further, in accordance with usual double tube vibration damper units the first valve means may be such as to provide on inward movement of the piston rod member towards the bottom unit a liquid flow resistance for liquid flow from the second working chamber towards the first working chamber smaller than the liquid flow resistance of said second valve means against liquid flow from the second working chamber towards the annular chamber. Moreover, the first valve means may be such as to provide on outward movement of the piston rod unit a flow resistance for liquid flow from said first working chamber to said second working chamber larger than the liquid flow resistance provided by the second valve means for liquid flow from the annular chamber towards the second working chamber. This system provides a flow of damping liquid through the damping behavior control unit always in the same direction irrespective of the direction of movement of the piston rod member with the cylinder member.

A further aspect of this invention is the transition from the at least one transverse joint tube member into the respective section of the flow path tube unit. This aspect is applicable independently of the specific construction of the flow path tube unit. Accordingly the invention further comprises a vibration damper unit, the damping behavior of which is variable through at least one damping behavior control unit. The vibration damper unit comprises a cylinder member having an axis and two ends and defining a cavity therein. A piston rod member is sealingly guided through at least one of the two ends. A piston rod guiding and sealing unit is provided adjacent said at least one of the two ends and a bottom unit may be provided adjacent the other one of the two ends. Alternatively, the bottom unit may be integral with the cylinder member. A piston unit is combined with the piston rod member within the cavity. A plurality of spaces inside and outside the cavity is provided. A damping fluid is provided within at least part of these spaces. Flow path defining means define flow paths interconnecting respective spaces. Parts of the flow paths may be defined by the respective spaces themselves. At least one of the flow paths contains at least one damping behavior control unit. The flow path defining means include a flow path defining flow path tube unit. Thus a flow path tube unit surrounds the cylinder member and cooperates with the cylinder member to define radially between the cylinder member and the flow path tube unit a fluid flow chamber. The flow path tube unit has at least one transverse joint tube member extending substantially radially outwards from the connecting tube unit and is adjoined to or adapted for being adjoined to said at least one damping behavior control unit. This transverse joint tube member is integral with a respective section of the flow path tube unit. An integral transition zone extends between the respective section of the flow path tube unit and the transverse joint tube member. This transition zone is lowered radially inwards with respect to an outer circumferential surface of the respective section of the flow path tube unit. The transition zone may be obtained in accordance with usual cold shaping technics applied to sheet metal and tube material. As mentioned above, this embodiment of the transition zone is helpful for avoiding fissures in the transition zone. Moreover, it results in a relatively long tube section for engagement with the respective part of the damping behavior control unit and for providing sealing means allocated thereto.

As mentioned above, the transition zone may have a radially innermost internal surface portion opposite to the axis, the radial distance of said radially innermost internal surface portion from the axis may be equal to or slightly larger than an internal radius of the flow path tube unit adjacent an end portion of said flow path tube unit.

The transition zone may follow, when regarded in a plane of section containing an axis of the transverse joint tube member, a curve having a radius, said radius corresponding to a multiple of a wall thickness of the flow path tube unit adjacent the location of the transverse joint tube member. The transverse joint tube member may be in overlapping engagement or adapted for overlapping engagement with an adjoining member of the damping behavior control unit.

The various features of novelty which characterize the invention are pointed out with particularity in the claims annexed to and forming a part of the disclosure. For a better understanding of the invention, its operating advantages and specific objects attained by its use, reference should be had to the accompanying drawings and descriptive matter, in which there are illustrated and described preferred embodiments of the invention.

BRIEF DESCRIPTION OF THE DRAWINGS

The invention will be explained in greater detail hereinafter with reference to embodiments shown in the accompanying drawings in which.

DETAILED DESCRIPTION OF THE PREFERRED EMBODIMENTS

Figure 1:
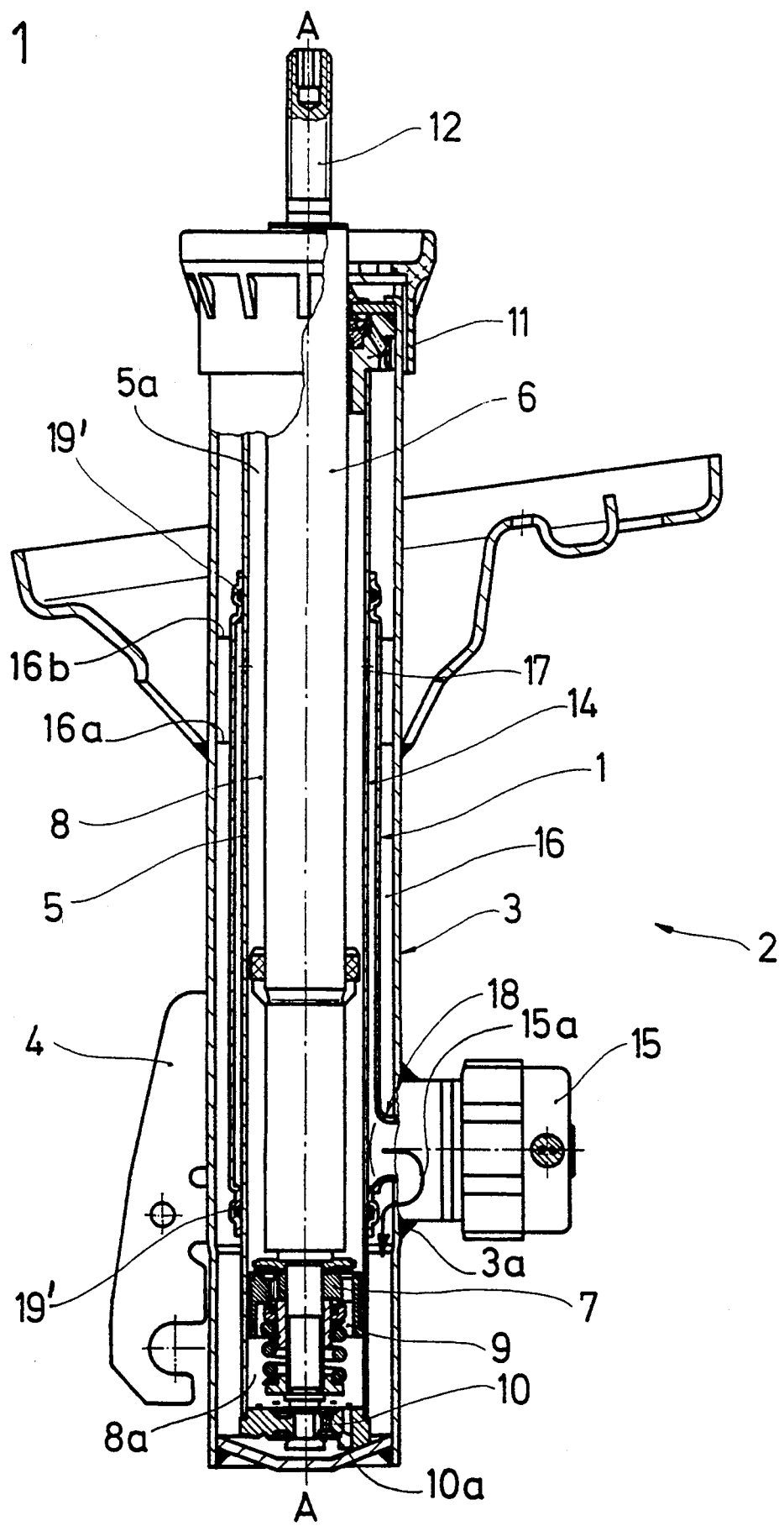
FIG. 1 shows a longitudinal section containing the axis of a vibration damper unit of this invention.

In FIG. 1 there is shown a vibration damper unit 2 in the form of a shock absorbing leg of a motor vehicle. A container 3 is provided with a connection member 4 by which the container can be connected with a axle system of a vehicle (not shown). Within the container 3 there is concentrically arranged a cylinder 5. The cylinder 5 is centered within the container 3 by a bottom unit 10 provided with valve means 10a. The upper end of the cylinder 5 is centered by a piston rod guiding and sealing unit 11. A piston rod 6 is sealingly guided by the sealing and guiding unit 11 and is combined within the cavity 5a of the cylinder 5 with a piston unit 7. The piston unit 7 is combined with a valve unit 9. The valve units 10a and 9 have a damping effect to be described later.

The upper and outer end portion of the piston rod 8 is provided with a connection bolt 12 by which the vibration damper unit can be connected with the body of a vehicle not shown.

A flow path tube 1 surrounds the cylinder 5 and is sealingly engaged with the external Surface of the cylinder 5 at 19 and 19'. A fluid flow chamber 14 is confined radially between the cylinder 5 and the flow path tube 1. The cavity 5a is subdivided by the piston unit 7 into a first working chamber 8 and a second working chamber 8a. The working chambers 8 and 8a are connectable through the valve system 9 whereas the annular chamber 16 defined between the cylinder 5 and the container 3 is connectable with the second working chamber 8a by the valve system 10a. The cylinder 1 is centered as can be seen from FIG. 1 with respect to the container 3 by the piston rod guiding and sealing unit 11 and by the bottom unit 10. The fluid flow chamber 14 is connected through a bore 17 with the first working chamber 8. Moreover, the fluid flow chamber 14 is connected through a transverse joint tube member 18 with an inlet of a damping behavior control unit 15. The outlet of the damping behavior control unit 15 is connected with the annular chamber 16. Such a flow path section 15a is obtained between the fluid flow chamber 14 and the annular chamber 16 across the damping behavior control unit 15. The damping behavior control unit is fixed to the container 3 by a welding 3a.

The working chambers 8 and 8a are filled with a damping liquid. The annular chamber 16 is filled with the same damming liquid up to the level 16a or 16b whereas the upper part of the annular chamber 16 is filled with gas.

The operation is substantially as follows: On downward movement of the piston rod 6 with respect to the cylinder 5 liquid is pressed from the working chamber 8a to the working chamber 8 through the valve means 9 of the piston unit 7 because the flow resistance through the valve means 9 in this phase of operation is relatively small as compared with the flow resistance through the valve means 10a from the working chamber 8a towards the annular chamber 16. Such the pressure is increased within the working chamber 8 as a result of the increasing volume of the piston rod 6 within the cavity 5a.

On upward movement of the piston rod 6 with respect to the cylinder 5 damping liquid from the working chamber 8 flows through the valve system 9 of the piston unit 7 whereas a flow of damping liquid can take place from the annular chamber 16 towards the lower working chamber 8a through the valve system 10a of the bottom unit 10. The flow resistance in this phase of operation through the valve means 9 is considerably larger than the flow resistance through the valve means 10a. Such the pressure within the upper working chamber 8 is again increased. One recognizes that in both phases of operation a damping effect is obtained. For the above mentioned mode of operation it was assumed that the damping behavior control unit is closed. This is a mode of operation with relative strong damping effect both at upward movement of the piston rod 6 and at downward movement of the piston rod 6.

For reducing the damping effect the damping behavior control unit 15 is opened such that the flow path section 15a is open with a certain throttling effect to be selected. The opening of the control unit 15 is obtained by electro-magnetic control means (not shown).

It is to be noted again that both on inward movement and on outward movement of the piston rod 6 the pressure of damping liquid within the upper working chamber 8 is increased. The damping liquid within the upper working chamber 8 can flow both at inward movement and at outward movement of the piston rod 6 from the working chamber 8 through the opening 17, the fluid flow chamber 14 and the damping behavior control unit 15 (along the flow path section 15a) to the annular chamber 16. Such a bypass is opened for the liquid flow in both phases of operation. Thanks to this bypass the total flow resistance to the liquid leaving the upper working chamber 8 is reduced and the damping behavior of the vibration damper unit is softer.

The damping behavior control unit 15 may also be a throttling device of variable flow resistance, the flow resistance being controllable by electro-magnetically controlled valve means.

Figure 2:
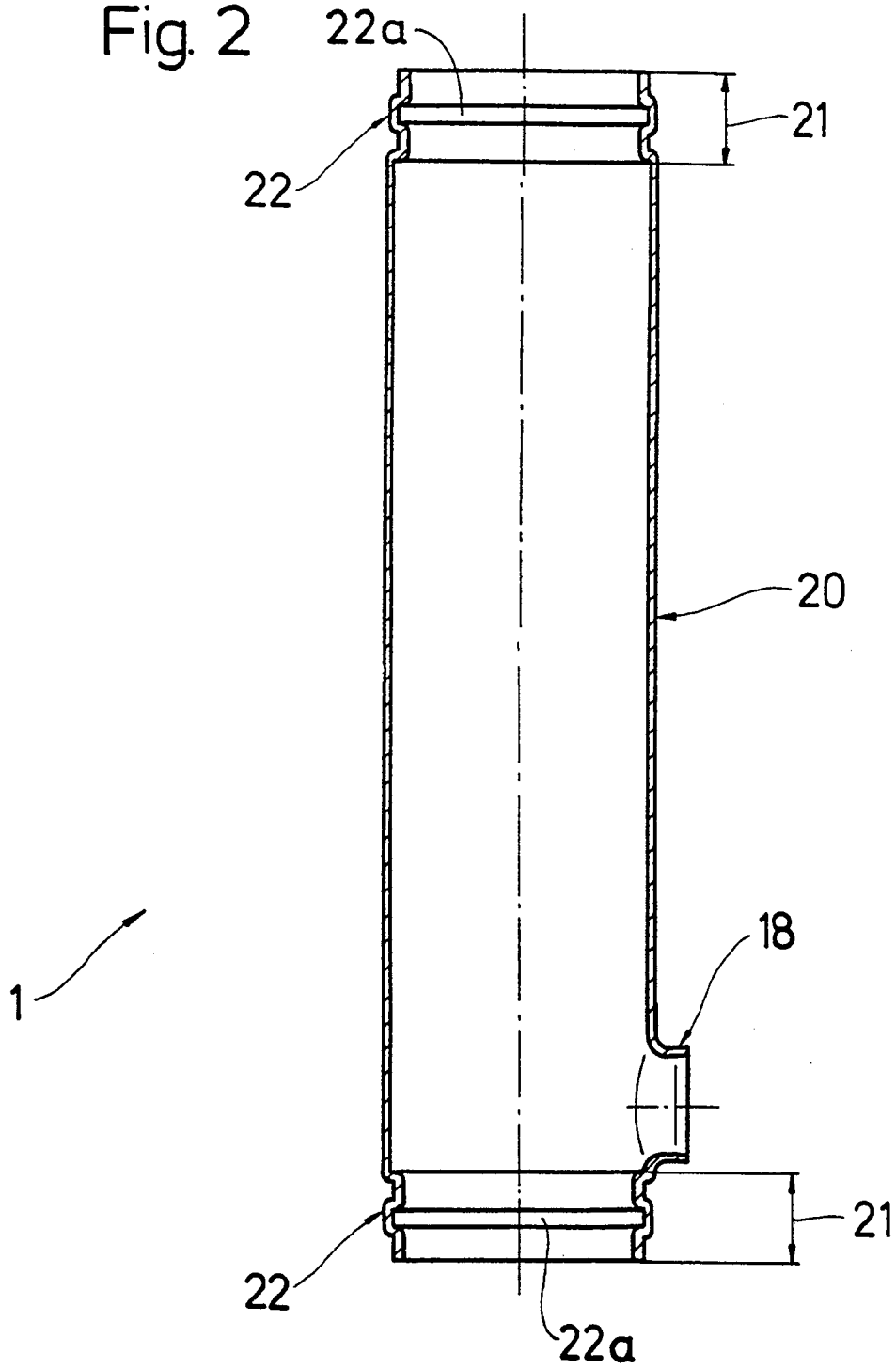
FIGS. 2-5 show various embodiments of a flow path tube unit integrally shaped.

In FIG. 2 the flow path tube 1 is shown more detailed. This flow path tube 1 comprises a middle section 20 and two end sections 21 with the transverse joint tube member 18 being integrally shaped from the middle section 20. The flow path tube 1 is in this embodiment an integral body along its total length. The end sections 21 are reduced in diameter as compared with the diameter of the middle section 20 such as to obtain the radial distance defining the fluid flow chamber 14 in FIG. 1. The terminal sections or end portions 21 are provided with beads 22 defining radially inwards open grooves 22a for accommodating chambered sealing means (not shown in FIG. 2, but recognizable from FIG. 1). These sealing means are as shown in FIG. 1 sealingly engaged with an external surface of the cylinder 5, so that the fluid flow chamber 14 is closed at both ends. The diameter reduction in the end portions 21 and the beads 22 forming the grooves 22a are manufactured without swarf-cutting by usual cold forming methods as used in metal tube shaping. The production without cutting provides a very economical handling of the material. Moreover, the hardness of the material is increased by the cold shaping in the region of the end portions 21 and the beads 22. One recognizes that the wall thickness remains substantially unchanged and that annular ribs are provided on the external side of the flow path tube 1. Also the transverse joint tube member 18 is integrally made by cold shaping methods without swarf cutting machining operations. Such the transverse joint tube member 18 is again hardened. Harmful influences or notches or striations arising from machining are completely eliminated. The integral part 1 as shown in FIG. 2 can be mass produced in reliable manner, so that the seal checks which had hitherto been necessary for welded flow path tube units again are eliminated. The manufacturing process results in considerable cost advantages seeing that, as already mentioned, machining and welding operations are dispensed with.

The geometrical dimensions, such as the diameter of the end portions 21 and of the middle section 20 are dependent from the outer diameter of the cylinder 5. Depending on the specific damper construction the flow path tube 1 can also be centered on respective centering faces of the piston rod sealing and guiding unit 11 and the bottom unit 10. When setting the dimensions of the flow path tube I the necessary amount of damping medium is to be taken into consideration, particularly in dimensioning the middle section 20.

Differences in length of the flow path tube can be attended to very simply, as the end portion 21 with the seal receiving beads 22 and the transverse joint tube member 18 can be made in using different tools.

The wall thickness of the flow path tube 1 can be relatively thin, as no addition of material is necessary for welding and soldering.

Figure 3:
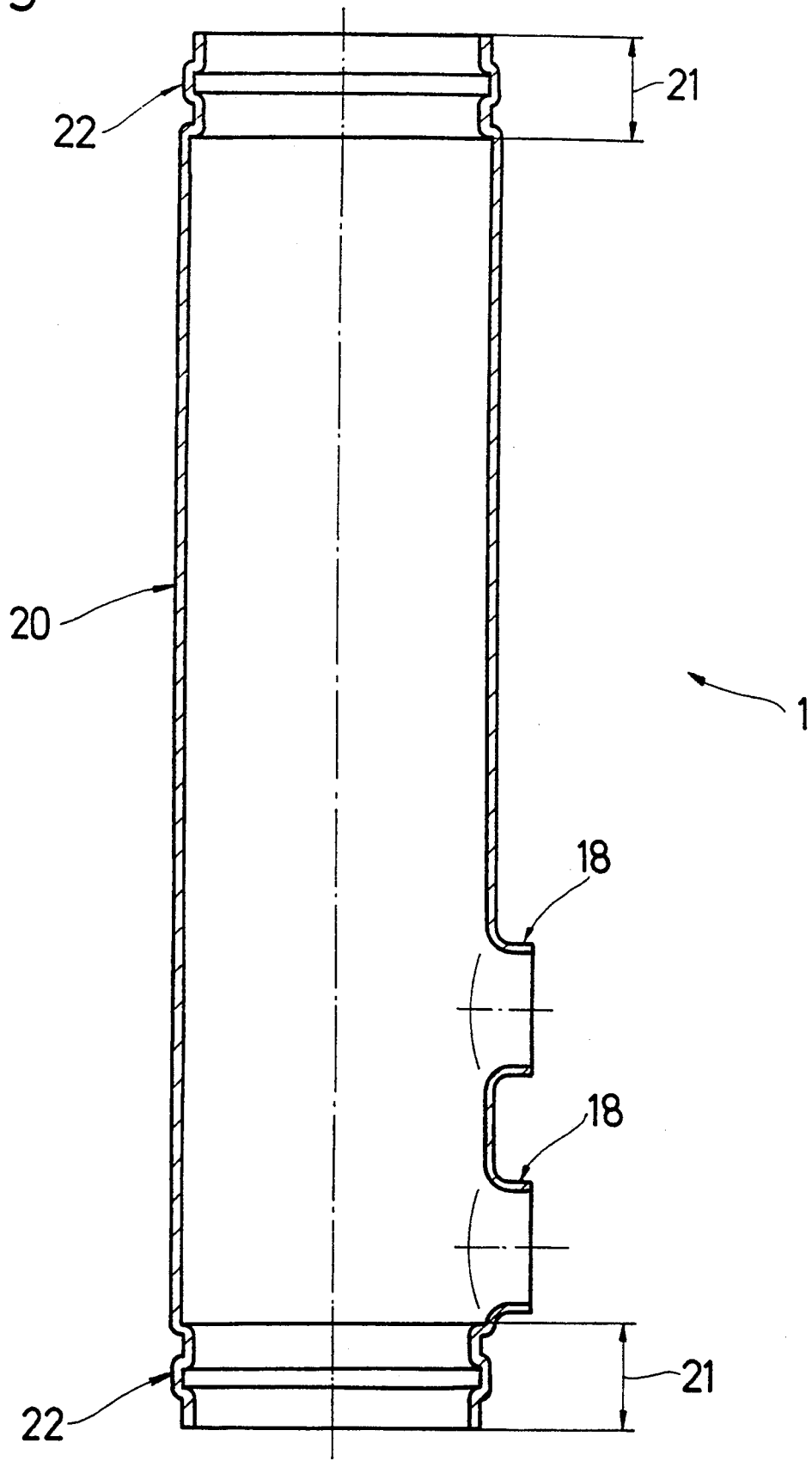
Figure 4:
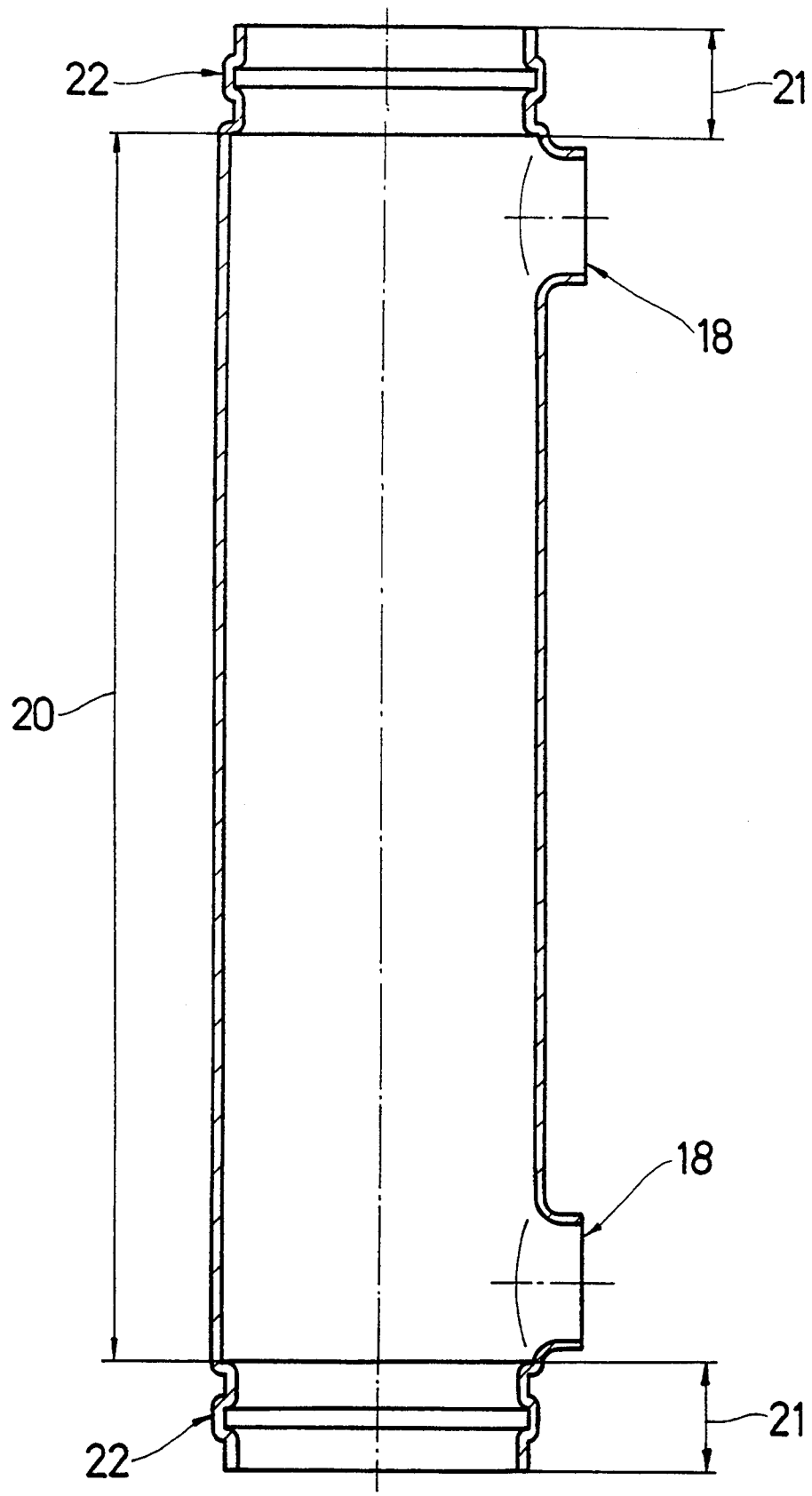
Figure 5:
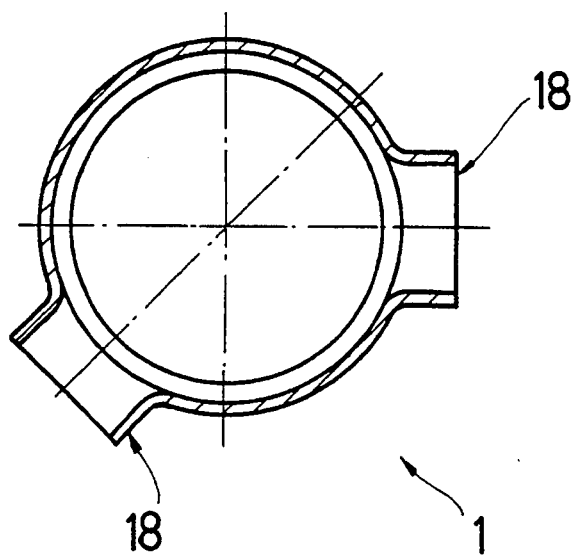

In FIGS. 3, 4 and 5 various embodiments are shown of a flow path tube 1. One recognizes the large variability which can be obtained in spite of the integrality of the tube unit 1. Such one can cover all existing types and dimensions. It is particularly interesting according to FIG. 5 that the transverse joint tube members 18 need not be contained with their respective longitudinal axis in a common plane containing the longitudinal axis of the tube 1. This is of great advantage because with the narrow spaces nowadays afforded for construction in the wings of vehicles, the damping behavior control units 15, FIG. 1, projecting from the container 3, FIG. 1, have occasionally to be mounted on the container 3 in various angular locations.

Figure 4A:
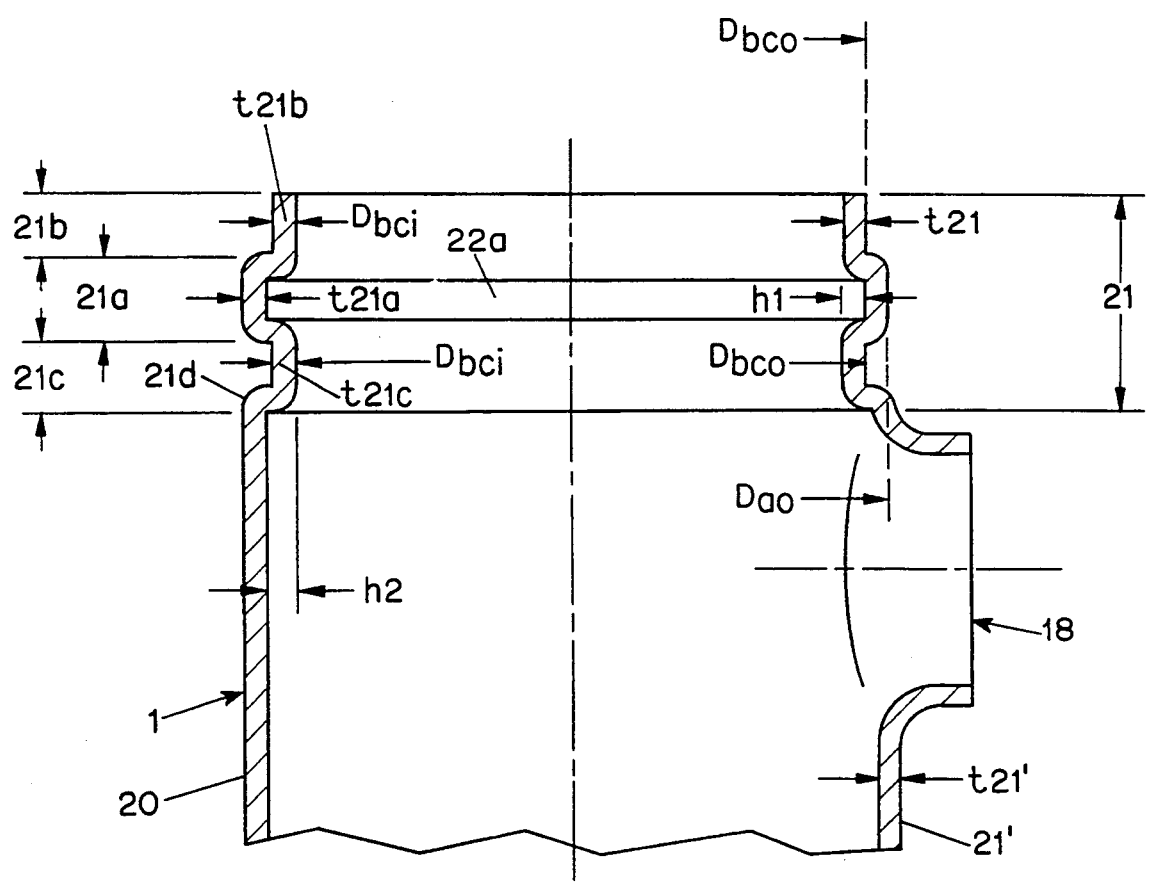
FIG. 4A is a fragmentary detail view on an enlarged scale of the upper end portion of the flow path tube unit of FIG. 4 and is typical of the end portions of all embodiments.

Referring to FIG. 4A, the end portions of all flow path tube units have a sealing means receiving groove 22a having a radial depth h1. As previously explained, the end portion 21 of the tube section 20 of the flow path tube unit 1 has a substantially equal wall thickness t21 as compared with the wall thickness t21' of an adjacent portion of said portion 21' of the tube section 20. The sealing means receiving groove 22a is located in the flow path tube end portion 21 in an axially intermediate area of said flow path tube end portion, said axially intermediate area 21a of the flow path tube end portion 21 being located axially between a terminal area 21b, and a transition area 21c, the transition area 21c being joined with said adjacent tube portion 21' by a shoulder portion 21d. The flow path tube end portion 21 has in the transition area 21c and in the terminal area 21b respective internal diameters Dbci corresponding to an external diameter De of the member that the flow path tube end portion is fitted to, which may be an external engagement face 5e of the cylinder member 5, the piston rod sealing and guiding unit 11, or the bottom unit 10. The flow path tube end portion 21 has substantially equal wall thicknesses t21c, t21b, t21a in the transition area 21c, the terminal area 21b and the axially intermediate area 21a. The axially intermediate area 21a has an outer diameter Dao larger than the respective outer diameters Dbco of the transition area 21c and the terminal area 21b. The shoulder portion 21d has a radial height h2 substantially corresponding to the radial height h2 of the fluid flow chamber 14.

In FIGS. 6 to 10 the flow path tube units 1 are shown in modular construction.

Figure 6:
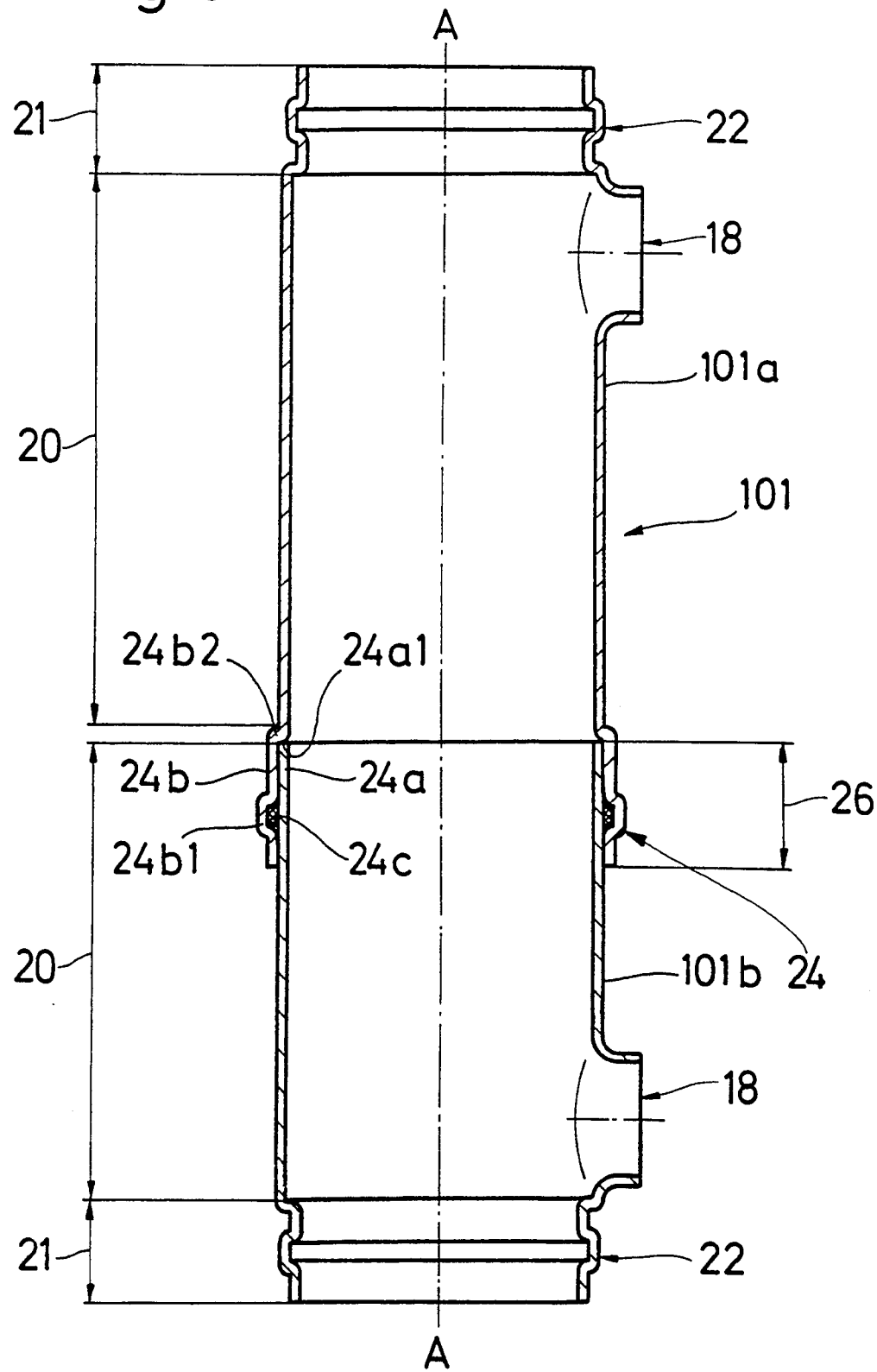
FIGS. 6-10 show various embodiments of a flow path tube unit combined by a plurality of a tube section produced separate from each other.

In FIG. 6 the unit 101 consists of two sections 101a and 101b. The end portions 21 may be equal or modulized for both sections 101a and 101b as indicated at 21. The straight portions 20 may be equal or different in length. The transverse joint tube members 18 may again be equal or different. The sections 101a and 101b are joined together by overlapping connection portions as indicated at 24. The overlapping connecting portions are designated by 24a and 24b. The radially outer overlapping connecting portion 24b is provided with a groove forming bead 24b1. The groove accommodates a sealing means in the shape of an O-ring 24c. A great advantage of the flow path tube unit 101 in modular construction as shown in FIG. 6 is the further enhanced versatility because the sections 101a and 101b can be telescoped with respect to each other within limits and can be rotated relative to one another. The overlapping length can be limited by a shoulder 24b2 and an edge 24a1. The overlapping length is indicated by 26. At full overlapping, i.e., when the edge 24a1 abuts the shoulder 24b2 the minimum length of the unit is obtained. The stepless rotatability of the sections 101a and 101b relative to one another covers all angular combinations of the damping behavior control units to be fastened to the transverse joint tube members 18. The connecting portions 24a and 24b can be cold shaped by non-cutting shaping techniques.

Figure 7:
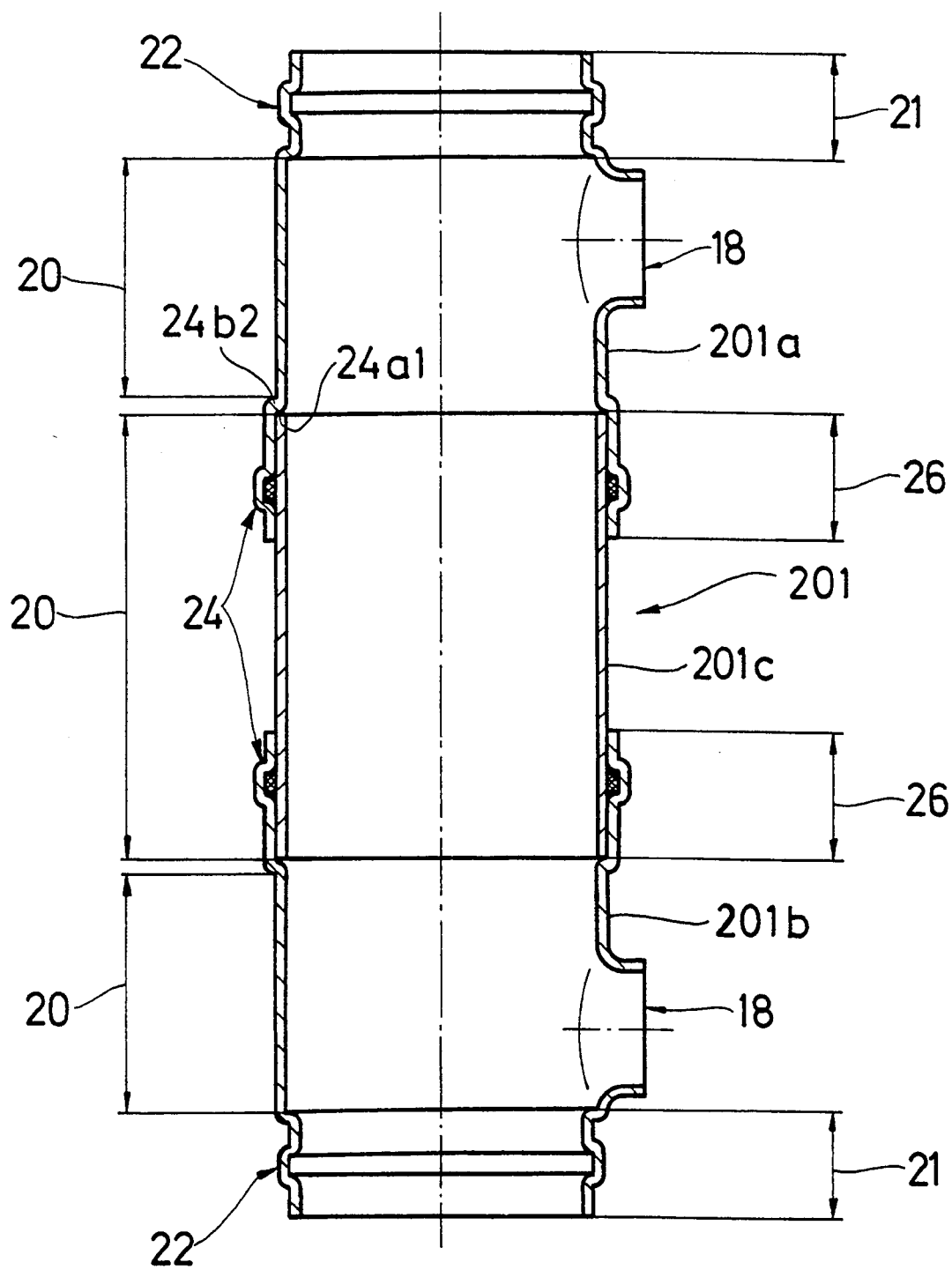

In FIG. 7 analogous parts are designated with the same reference numerals as in FIG. 6. In this embodiment the flow path tube unit 201 comprises three sections 201a, 201b and 201c. The end portions 21 are identically constructed. Also the overlapping connections 24 are identically constructed. The great advantage is that by simple exchange of the middle section 201c every desired length can be obtained without the sections 201a and 201b having to be modified.

In the embodiment of FIG. 8 analogous parts are again designated with the same reference numerals. In this embodiment the flow path tube unit 301 consists of three sections 301a, 301b and 301c. The section 301c can be offered in different lengths. In this embodiment the transverse joint tube member is provided in the middle section 301c. The location of the transverse joint tube member 18 may be varied along the axis with respect to the middle section 301c.

It is of advantage that the joint tube member can be provided on a section of smooth cylindrical form.

Figure 8:
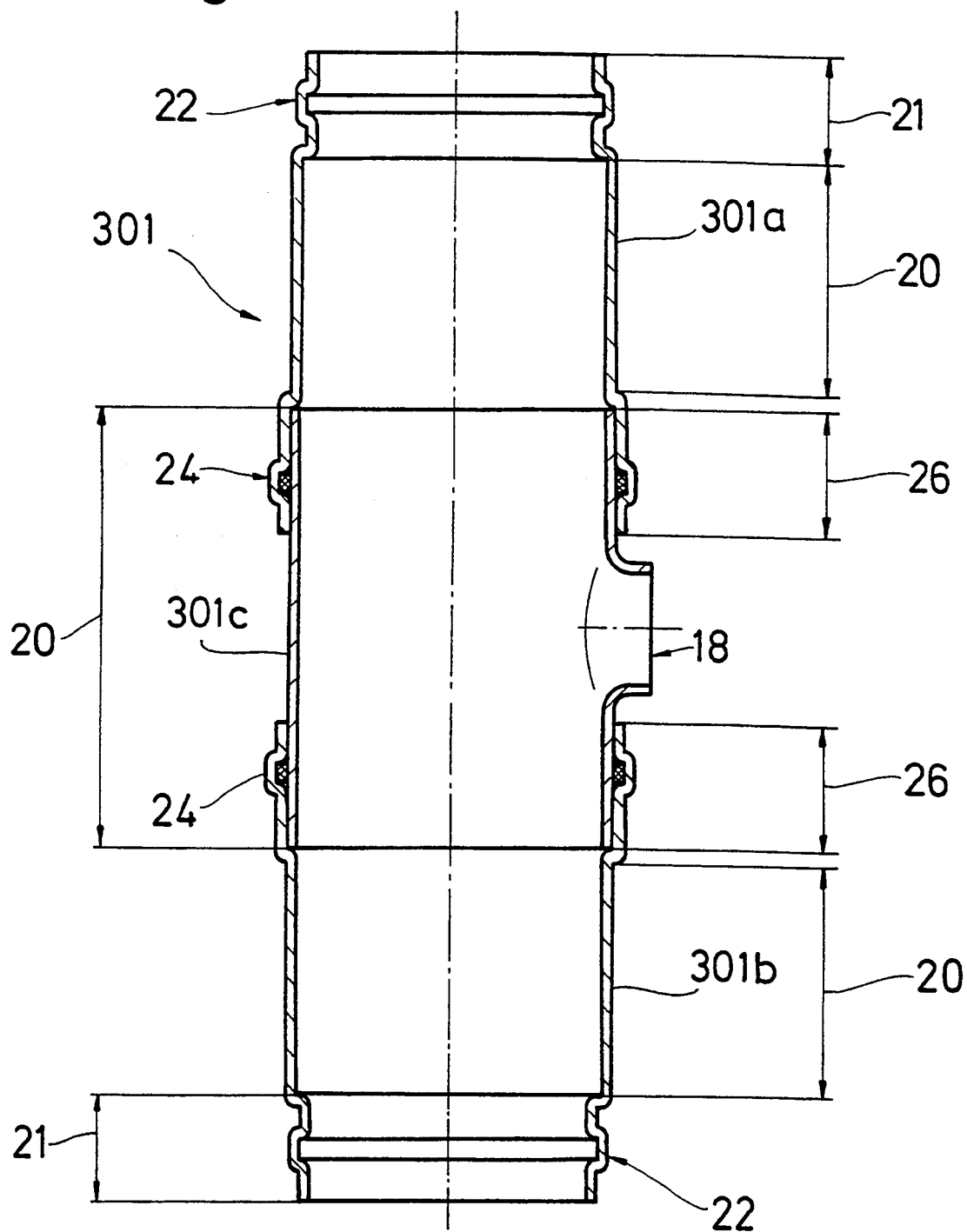
Figure 9:
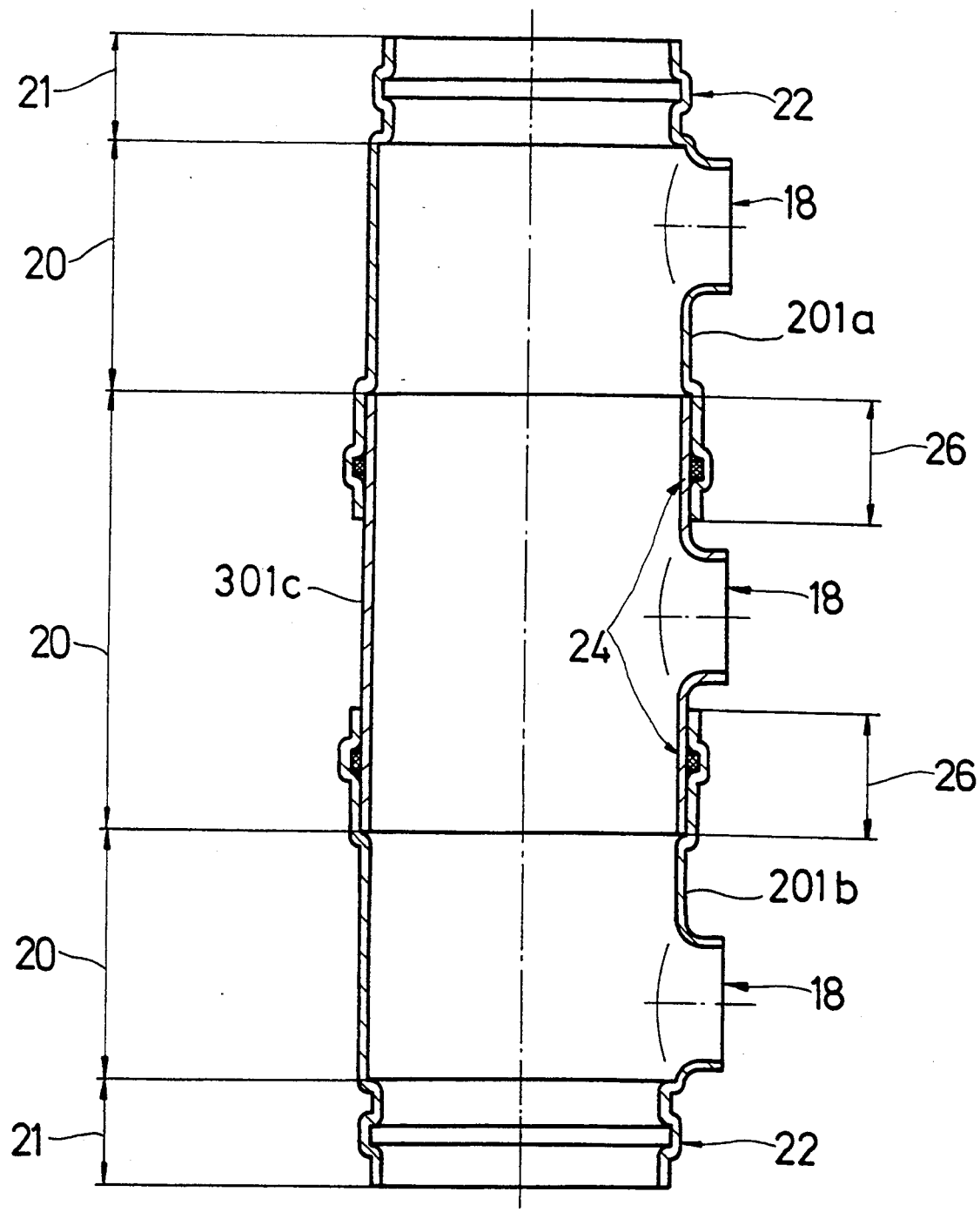

In FIG. 9 a middle section 301c of FIG. 8 has been combined with two end sections 201a and 201b of FIG. 7. This shows once more the great number of variation possibilities.

Figure 10:
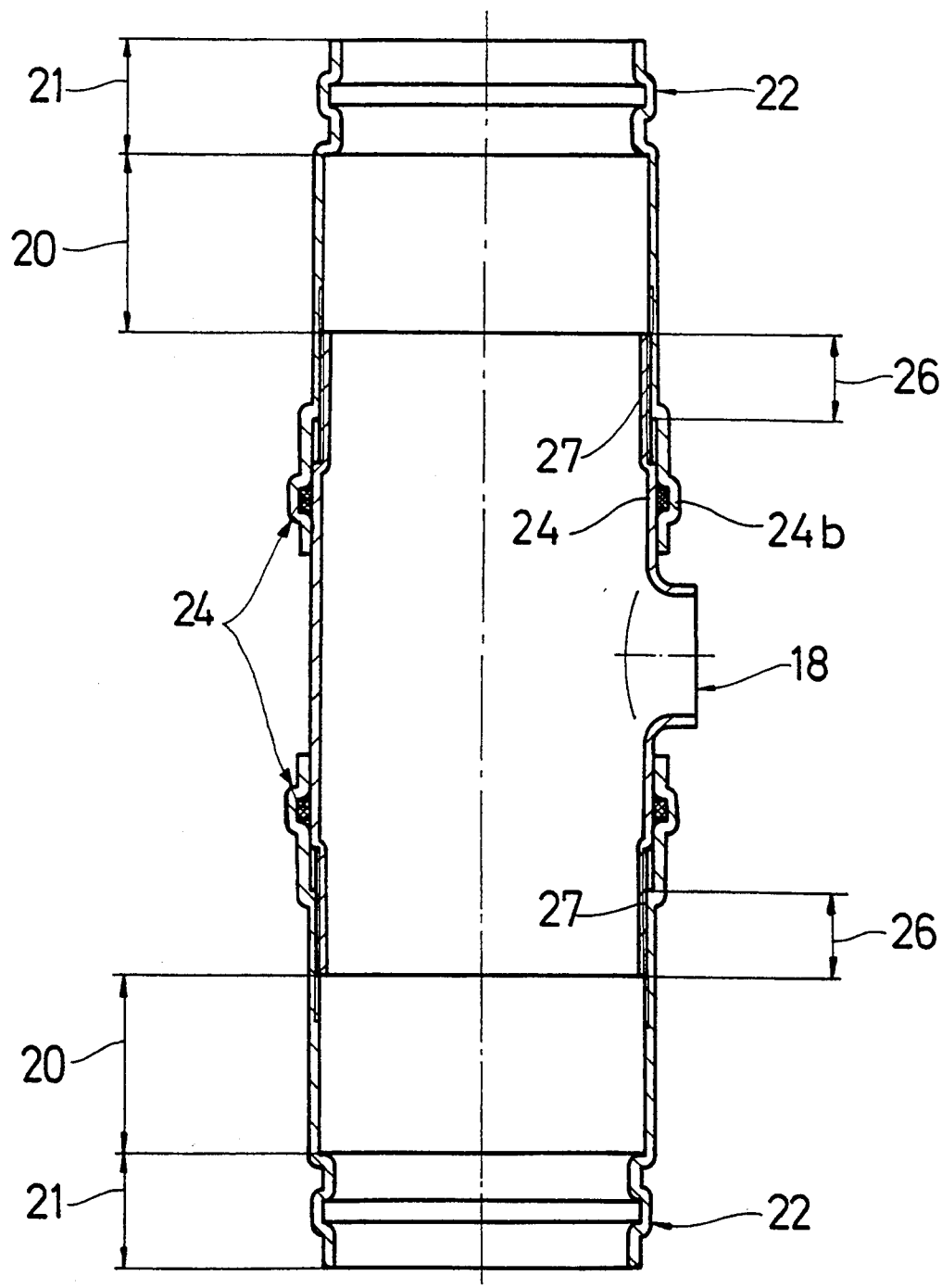

In FIG. 10, differently from FIGS. 6 to 9, the overlapping connections 24 are provided with screw connections 27. Bundles of O-rings can be provided in the grooves. The threads may be made by a non-cutting cold shaping technique as the grooves.

In FIG. 11 one can see again the transverse joint tube member 18 integrally manufactured together with the flow path tube unit 1. The member 28 is a valve seat member of the damping behavior control unit 15. This member 18 is provided with an engagement face 28a for engaging an internal face of the transverse joint tube member 18. An O-ring 29 is located within a groove 30 of the member 28. Alternatively, a groove for accommodating the O-ring 29 could be also provided in the transverse joint tube member 18. In the latter case this groove could be again formed as a bead, which is obtained by a cold shaping method without swarf cutting machining.

The length of the transverse joint tube member 18 and the overlapping thereof with the member 28 are such that length tolerances can be compensated for.

The member 28 can be welded to the container 3. No further connection between the member 28 and the transverse joint tube member 18 is necessary beyond introducing the member 28 into the transverse joint tube member 18.

Figure 11:
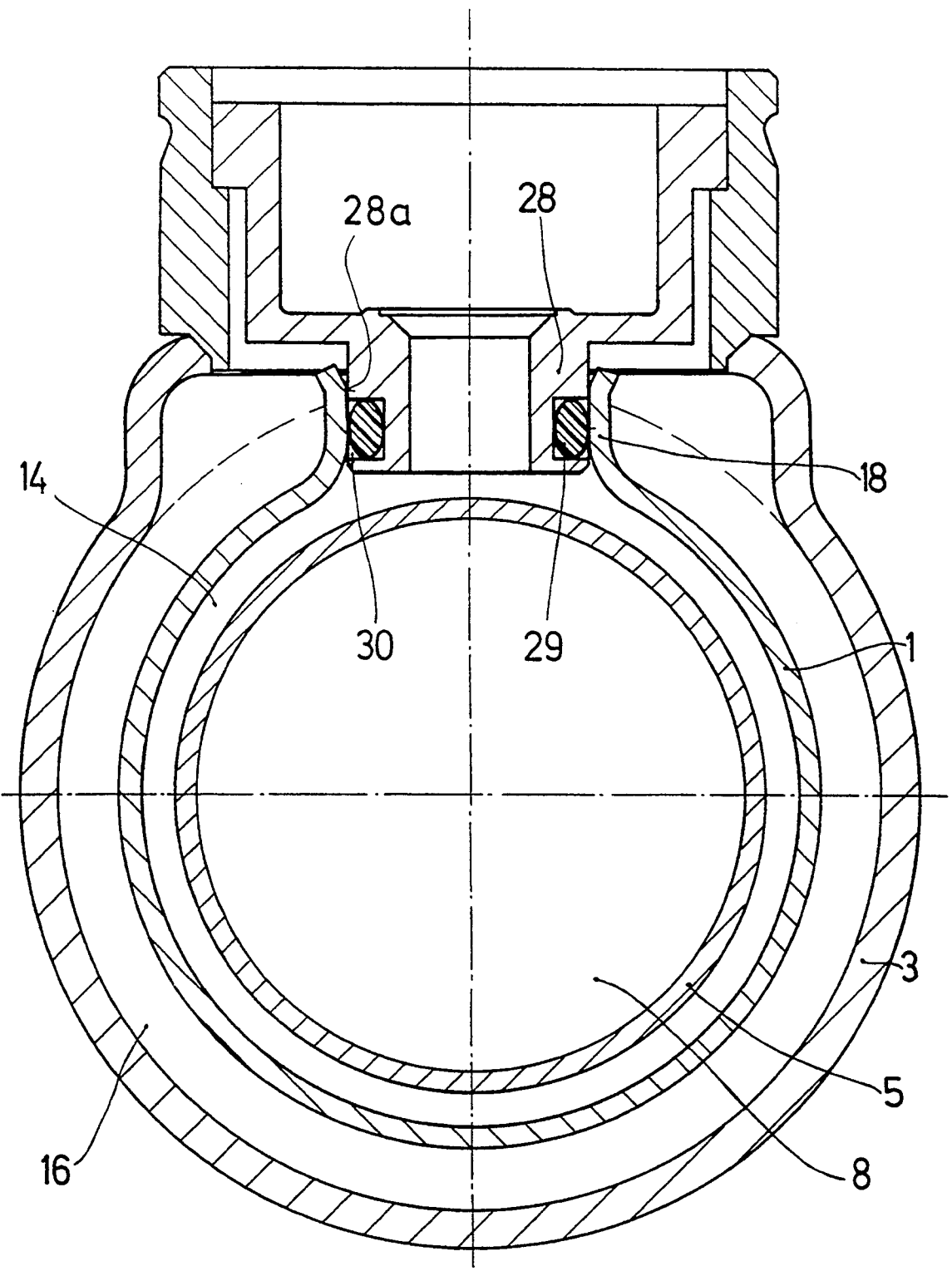
FIG. 11 shows a cross-sectional view of the vibration damper unit, said section being substantially orthogonal with respect to the axis of the unit at the axial location of a damping behavior control unit.
Figure 12:
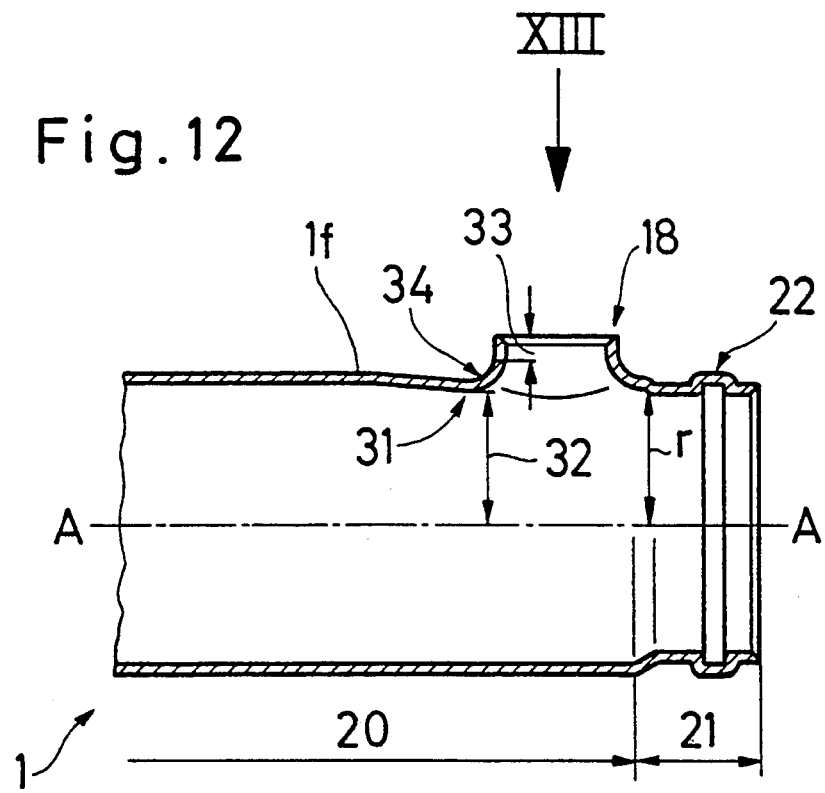
FIG. 12 shows a longitudinal section of a further embodiment of a flow path tube unit with a modified transition between the wall of the flow path tube unit and a transverse joint tube member and FIG. 13 shows a plane view on the embodiment of FIG. 12 along an axis of the transverse joint tube member in the direction of arrow XIII of FIG. 12.
Figure 13:
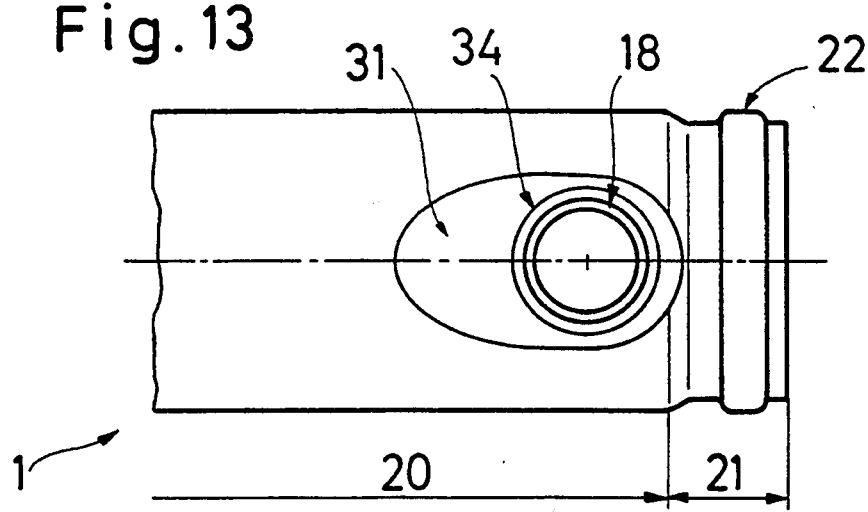

In the embodiment of FIGS. 12 and 13 a transition zone 31 is provided between the flow path tube unit 1 and the transverse joint tube member 18. This transition zone 31 is lowered with respect to an adjacent surface portion of the external surface of the tube 1 towards the axis A-A. Thus a smooth transition 31 is provided this transition allows an increased radius of curvature 34 without increasing the total cross-sectional area of the flow path tube unit 1 at the location of the transverse joint tube member 18. The cylindrical section 33 of the transverse joint tube member can nevertheless be lengthened for reliable engagement with the O-ring 29 as shown in FIG. 11. The radius of curvature indicated at 34 may be a multiple of the wall thickness of the flow path tube as regarded at the location 1f. The radial distance of the radially innermost portion of the transition zone 34 is indicated by 32 in FIG. 12. This radial distance 32 is equal or somewhat larger than the radius r of the end portion 21. By the transition zone 31 stress concentration is reduced. The load limit for the transverse joint tube member can be considerably increased. This has been proved by pulsation experiments.

Particularly with small diameters of the flow path tube unit 1 and large lengths of the transverse joint tube member 18 the transition zone 31, as shown in FIG. 12, is of high advantage because the material necessary for the transverse joint tube member can be stretched from the material of the flow path tube 1.

While specific embodiments of the invention have been shown and described in detail to illustrate the application of the inventive principles, it will be understood that the invention may be embodied otherwise without departing from such principles.

The reference numerals in the claims are only used for facilitating the understanding and are by no means restrictive.

We claim:

1. A vibration damper unit, the damping behavior of which is variable through at least one damping behavior control unit (15), said vibration damper unit comprising a cylinder member (5) having an axis (A-A) and two ends and defining a cavity (5a) therein, a piston rod member (6) sealingly guided through at least one of said two ends, a piston rod guiding and sealing unit (11) adjacent said at least one of said two ends, a bottom unit (10) adjacent the other one of said two ends, a piston unit (9) combined with said piston rod member (6) within said cavity (5a), a plurality of spaces (8, 8a, 14, 16) inside and outside said cavity (5a), a damping fluid within at least part of said spaces, flow path defining means defining flow paths interconnecting respective spaces, at least one (17, 14, 15a, 16) of said flow paths containing said at least one damping behavior control unit (15), said flow path defining means including a flow path defining flow path tube unit (1), said flow path tube unit (1) surrounding said cylinder member (5) and cooperating with said cylinder member (5) to define radially between said cylinder member (5) and said flow path tube unit (1) a fluid flow chamber (14) having a radial height (h2), said flow path tube unit (1) having axially spaced flow path tube end portions (21), said flow path tube unit (1) having at least one transverse joint tube member (18) extending substantially radially outward from said flow path tube unit (1) and being adapted to be adjoined to said at least one damping behavior control unit (15), said at least one flow path tube end portion (21) comprising a sealing means receiving groove (22a) having a radial depth (h1), said sealing means receiving groove (22a) accommodating annular sealing means for substantially sealing said fluid flow chamber (14), said at least one flow path tube end portion (21) being an integral portion of a tube section (20) of said flow path tube unit (1) and being formed by cold-shaping without swarf-cutting of the sealing means receiving groove (22a), said sealing means receiving groove (22a) being located in said flow path tube end portion (21) in an axially intermediate area of said flow path tube end portion (21), said axially intermediate area (21a) of said flow path tube end portion (21) being located axially between a terminal area (21b) of said flow path tube end portion (21) and a transition area (21c) of said flow path tube end portion (21), said transition area (21c) being coherent with said adjacent tube portion (21') by a shoulder portion (21d), said flow path tube end portion (21) having in said transition area (21c) and in said terminal area (21b) respective internal diameters (Dbci) corresponding to an external diameter (De) of an external engagement face (5e) of one of said cylinder member (5), said piston rod sealing and guiding unit (11) and said bottom unit (10), the wall thicknesses (t21c, t21b, t21a) in said transition area (21c), said terminal area (21b) and said axially intermediate area (21a), being substantially equal to the wall thickness (t21') of an adjacent portion of said portion (21') of said tube section (20), said axially intermediate area (21a) having an outer diameter (Dao) larger than respective outer diameters (Dbco) of said transition area (21c) and said terminal area (21b), said shoulder portion (21d) having a radial height (h2) substantially corresponding to said radial height (h2) of said fluid flow chamber (14).

2. A vibration damper unit as set forth in claim 1, said at least one flow path tube end portion (21) being axially movable with respect to said cylinder member (5).

3. A vibration damper unit as set forth in claim 1, both said flow path tube end portions (21) comprising a respective sealing means receiving groove (22a), said sealing means receiving grooves (22a) accommodating respective annular sealing means.

4. A vibration damper unit as set forth in claim 1, said transverse joint tube member (18) being integral with a longitudinal section of said flow path tube unit (1).

5. A vibration damper unit as set forth in claim 1, said flow path tube unit (1) being substantially integral along its total length between said axially spaced flow path tube end portions (21).

6. A vibration damper unit as set forth in claim 1, said flow path tube unit (101) comprising a plurality of at least two axially subsequent flow path tube sections (101a,101b).

7. A vibration damper unit as set forth in claim 6, at least part of said flow path tube sections (101a,101b) being rotatable with respect to a respective adjacent flow path tube section (101b,101a) about said axis (A-A).

8. A vibration damper unit as set forth in claim 7, at least two of said flow path tube sections (101a,101b) which are rotatable with respect to each other being provided with at least one respective transverse joint tube member (18).

9. A vibration damper unit as set forth in claim 6, mutually adjacent flow path tube sections (101a,101b) of said flow path tube unit (101) having axially overlapping connecting portions (24a,24b).

10. A vibration damper unit as set forth in claim 9, one (24b) of said axially overlapping connecting portions (24a,24b) being provided with a sealing means receiving groove (24b1) open in radial direction towards the other one (24a) of said axially overlapping connecting portions (24a,24b), said sealing means receiving groove (24b1) accommodating annular sealing means (24c).

11. A vibration damper unit as set forth in claim 10, said sealing means receiving groove (24b1) being provided by a radially outer one (24b) of said axially overlapping connecting portions (24a,24b) and being open in radial direction towards an inner one (24a) of said axially overlapping connecting portions (24a,24b).

12. A vibration damper unit as set forth in claim 10, said sealing means (24c) allocated to said overlapping connecting portions (24a,24b) comprising at least one O-ring member.

13. A vibration damper unit as set forth in claim 9, said mutually overlapping connecting portions (24a,24b) being provided with respective abutment means (24b2,24a1) defining a position of maximum overlapping (26).

14. A vibration damper unit as set forth in claim 13, said respective abutment means (24b2,24a1) being provided by a terminal edge (24a1) of one (24a) of said axially overlapping connecting portions (24a,24b) and a transition shoulder (24b2) provided adjacent the other one (24b) of said axially overlapping connecting portions.

15. A vibration damper unit as set forth in claim 10, said mutually overlapping connecting portions (24a,24b) being telescopically movable with respect to each other in axial direction.

16. A vibration damper unit as set forth in claim 9, said axially overlapping connecting portions (24a,24b) being in mutual thread engagement (27).

17. A vibration damper unit as set forth in claim 6, said subsequent flow path tube sections (101a,101b) being provided with mutually engaged connecting portions (24a,24b) obtained by non-cuttingly shaping of said flow path tube sections (101a,101b), said non-cuttingly shaped connecting portions (24a,24b) comprising at least one bead-shaped groove (24b1) and/or a shoulder (24b2) and/or thread means.

18. A vibration damper unit as set forth in claim 1, said flow path tube unit (1) being provided with a plurality of at least two transverse joint tube members (18).

19. A vibration damper unit as set forth in claim 1, said flow path tube unit (1) having two terminal flow path tube sections (21) and a middle flow path tube section (20) therebetween, the end portion (21) of one of said terminal flow path tube sections (21) being sealed with respect to said external engagement face of one of said cylinder member (5) and said piston rod guiding and sealing unit (11) and the end portion (21) of the other terminal flow path tube section (21) being sealed with respect to one of said cylinder member (5) and said bottom unit (10), said middle section (20) having a larger internal diameter than said terminal sections (21).

20. A vibration damper unit as set forth in claim 19, said internal diameter of said terminal sections (21) being substantially equal.

21. A vibration damper unit as set forth in claim 1, said flow path tube unit (1) being substantially concentric with respect to said cylinder member (5).

22. A vibration damper unit as set forth in claim 1, said annular sealing means of said at least one flow path tube end portion (21) comprising at least one O-ring member.

23. A vibration damper unit as set forth in claim 1, said transverse connecting tube member (18) being of such length as to be engaged or engageable with longitudinal overlapping with an engagement face of an adjoining member (28) of said damping behavior control unit (15).

24. A vibration damper unit as set forth in claim 23, said adjoining member (28) of said damping behavior control unit (15) being a valve seat member.

25. A vibration damper unit as set forth in claim 23, said engagement face of said adjoining member (28) being an external engagement face having a diameter substantially equal to an internal engagement face (28a) of said transverse joint tube member (18).

26. A vibration damper unit as set forth in claim 23, sealing means (29) being provided between said transverse joint tube member (18) and said adjoining member (28) of said damping behavior control unit (15).

27. A vibration damper unit as set forth in claim 26, said sealing means (29) being accommodated by an annular groove (30) of one of said engagement face of said adjoining member (28) and said transverse joint tube member (18).

28. A vibration damper unit as set forth in claim 1, said flow path tube unit (101) comprising two terminal flow path tube sections (201a, 201b) and one intermediate flow path tube section (201c) axially therebetween.

29. A vibration damper unit as set forth in claim 1, said transverse joint tube member (18) being integral with a respective section of said flow path tube unit (1), an integral transition zone (31) being provided between said section of said flow path tube unit (1) and said transverse joint tube member (18), said transition zone (31) being lowered radially inwards with respect to an adjacent outer circumferential surface (1f) of said section of said flow path tube unit (1).

30. A vibration damper unit as set forth in claim 29, said transition zone (31) having a radially innermost internal surface portion opposite to said-axis (A-A), the radial distance (32) of said radially innermost internal surface portion from said axis (A-A) being slightly greater than an internal radius (r) of said flow path tube unit (1) adjacent a respective flow path tube end portion (21).

31. A vibration damper unit as set forth in claim 29, said transition zone (31) following, when regarded in a plane of section containing an axis of said transverse joint tube member (18), a curve having a radius (34), said radius (34) corresponding to multiple of a wall thickness of said flow path tube unit (1) adjacent the location of the respective transverse joint tube member (18).

32. A vibration damper unit as set forth in claim 31, said radius of curvature (34) being at least three times, preferably at least five times said wall thickness.

33. A vibration damper unit as set forth in claim 1, said vibration damper unit further comprising a container member (3) surrounding said cylinder member (5) and said flow path tube unit (1), an annular chamber (16) being provided radially between said cylinder member (5) and said container member (3) radially outside of said flow path tube unit (1), said flow path (17,14,15a,16) containing said at least one damping behavior control unit (15) extending from said cavity (5a) through said fluid flow chamber (14) and said damping behavior control unit (15) towards said annular chamber (16).

34. A vibration damper unit as, set forth in claim 33, said cavity (5a) being subdivided by said piston unit (7) into two working chambers (8,8a), a first working chamber (8) adjacent said piston rod guiding and sealing unit (11) and a second working chamber (8a) adjacent said bottom unit (10), said first and said second working chambers (8,8a) being interconnected by first valve means (9) of said piston unit (7), said second working chamber (8a) being interconnected with said annular chamber (16) by second valve means (10a) allocated to said bottom unit (10), said first working chamber (8) and said second working chamber (8a) being substantially filled with a damping liquid, said annular chamber (16) being partially filled with said damping liquid and partially filled with gas, said first working chamber (8) being connected with said fluid flow chamber (14), said fluid flow chamber (14) being connected with first connection means of said damping behavior control unit (15), second connection means of said damping behavior control unit (15) being connected with said annular chamber (16).

35. A vibration damper unit as set forth in claim 34, said first valve means (9) providing on inward movement of said piston rod member (6) towards said bottom unit (10) a liquid flow resistance for liquid flow from said second working chamber (8a) towards said first working chamber (8) smaller than the liquid flow resistance of said second valve means (10a) against liquid flow from said second working chamber (8a) towards said annular chamber (16), said first valve means (9) providing on outward movement of said piston rod member (6) a flow resistance for liquid flow from said first working chamber (8) to said second working chamber (8a) larger than the liquid flow resistance provided by said second valve means (10a) for liquid flow from said annular chamber (16) towards said second working chamber (8a).

36. A vibration damper unit as set forth in claim 33, said damping behavior control unit (15) being fastened to said container member (3).

37. A vibration damper unit as set forth in claim 1, said damping behavior control unit (15) comprising shut-off valve means.

38. A vibration damper unit, the damping behavior of which is variable through at least one damping behavior control unit (15), said vibration damper unit (15) comprising a cylinder member (5) having an axis (A-A) and two ends and defining a cavity (5a) therein, a piston rod member (6) sealingly guided through at least one of said two ends, a piston rod guiding and sealing unit (11) adjacent said at least one of said two ends, a bottom unit

(10) adjacent the other one of said two ends, a piston unit (9) combined with said piston rod member (6) within said cavity (5a), a plurality of spaces inside and outside said cavity (5a), a damping fluid within at least part of said spaces, flow path defining means defining flow paths interconnecting respective spaces, at least one (5a,17,14,15a,16) of said flow paths containing said at least one damping behavior control unit (15), said flow path defining means including a flow path defining flow path tube unit (1), said flow path tube unit (1) surrounding said cylinder member (14) and cooperating with said cylinder member (5) to define radially between said cylinder member (5) and said flow path tube unit (1) a fluid flow chamber (14), said flow path tube unit (1) having at least one transverse joint tube member (18) extending substantially radially outwards from said flow path tube unit (1) and being adjoined to or adapted for being adjoined to said at least one damping behavior control unit (15), said transverse joint tube member (18) being integral with a respective section of flow path tube unit (1), an integral transition zone (31) being provided between said section of said flow path tube unit (1) and said transverse joint tube member (18), said transition zone (31) being lowered radially inwards with respect to an outer circumferential surface (1f) of said section of said flow path tube unit (1) towards said axis (A-A).

39. A vibration damper unit as set forth in claim 38, said transition zone (31) having a radially innermost internal surface portion opposite to said axis (A-A), the radial distance (32) of said radially innermost internal surface portion from said axis (A-A) being slightly larger than an internal radius (r) of said flow path tube unit (1) adjacent an end portion of said flow path tube unit (1).

40. A vibration damper unit as set forth in claim 38, said transition zone (31) following—when regarded in a plane of section containing an axis of said transverse joint tube member (18)—a curve having a radius (34), said radius (34) corresponding to a multiple of a wall thickness of said flow path tube unit (1) adjacent the location of said transverse joint tube member (18).

41. A vibration damper unit as set forth in claim 38, said transverse joint tube member (18) being in overlapping engagement or adapted for overlapping engagement with an adjoining member (28) of said damping behavior control unit (15).

42. A vibration damper unit, the damping behavior of which is variable through at least one damping behavior control unit (15), said vibration damper unit comprising a cylinder member (5) having an axis (A-A) and two ends and defining a cavity (5a) therein, a piston rod member (6) sealingly guided through at least one of said two ends, a piston rod guiding and sealing unit (11) adjacent said at least one of said two ends, a bottom unit (10) adjacent the other one of said two ends, a piston unit (9) combined with said piston rod member (6) within said cavity (5a), a plurality of spaces (8, 8a, 14, 16) inside and outside said cavity (5a), a damping fluid within at least part of said spaces, flow path defining means defining flow paths interconnecting respective spaces, at least one (17, 14, 15a, 16) of said flow paths containing said at least one damping behavior control unit (15), said flow path defining means including a flow path defining flow path tube unit (1), said flow path tube unit (1) surrounding said cylinder member (5) and cooperating with said cylinder member (5) to define radially between said cylinder member (5) and said flow path tube unit (1) a fluid flow chamber (14) having a radial height (h2), said flow path tube unit (1) having axially spaced flow path tube end portions (21), said flow path tube unit (1) having at least one transverse joint tube member (18) extending substantially radially outward from said flow path tube unit (1) and being adapted to be adjoined to said at least one damping behavior control unit (15), said at least one flow path tube end portion (21) comprising a sealing means receiving groove (22a) having a radial depth (h1), said sealing means receiving groove (22a) accommodating annular sealing means for substantially sealing said fluid flow chamber (14), said at least one flow path tube end portion (21) being an integral portion of a tube section (20) of said flow path tube unit (1) and being formed by cold-shaping without swarf-cutting of the sealing means receiving groove (22a) said sealing means receiving groove (22a) being located in said flow path tube end portion (21) in an axially intermediate area of said flow path tube end portion (21), said axially intermediate area (21a) of said flow path tube end portion (21) being located axially between a terminal area (21b) of said flow path tube end portion (21) and a transition area (21c) of said flow path tube end portion (21), said transition area (21c) being coherent with said adjacent tube portion (21') by a shoulder portion (21d), said flow path tube end portion (21) having in said transition area (21c) and in said terminal area (21b) respective internal diameters (Dbci) corresponding to an external diameter (De) of an external engagement face (5e) of one of said cylinder member (5), said piston rod sealing and guiding unit (11) and said bottom unit (10), the wall thicknesses (t21c, t21b, t21a) in said transition area (21c), said terminal area (21b) and said axially intermediate area (21a), being substantially equal to the wall thickness (t21') of an adjacent portion of said portion (21') of said tube section (20), said axially intermediate area (21a) having an outer diameter (Dao) larger than respective outer diameters (Dbco) of said transition area (21c) and said terminal area (21b), said shoulder portion (21d) having a radial height (h2) substantially corresponding to said radial height (h2) of said fluid flow chamber (14) said transverse joint tube member (18) being integral with a longitudinal section of said flow path tube unit (1), said transverse joint tube member (18) being of such length as to be engageable with longitudinal overlapping with an engagement face of an adjoining member (28) of said damping behavior control unit (15), said adjoining member (28) of said damping behavior control unit (15) being a valve seat member, said engagement face of said valve seat member (28) being an external engagement face having a diameter substantially equal to an internal engagement face (28a) of said transverse joint tube member (18), sealing means (29) being provided between said transverse joint tube member (18) and said valve seat member (28) of said damping behavior control unit (15).

43. A vibration damper unit, the damping behavior of which is variable through at least one damping behavior control unit (15), said vibration damper unit comprising a cylinder member (5) having an axis (A-A) and two ends and defining a cavity (5a) therein, a piston rod member (6) sealingly guided through at least one of said two ends, a piston rod guiding and sealing unit (11) adjacent said at least one of said two ends, a bottom unit (10) adjacent the other one of said two ends, a piston unit (9) combined with said piston rod member (6) within said cavity (5a), a plurality of spaces (8, 8a, 14, 16) inside and outside said cavity (5a), a damping fluid within at least part of said spaces, flow path defining means defining flow paths interconnecting respective spaces, at least one (17, 14, 15a, 16) of said flow paths containing said at least one damping behavior control unit (15), said flow path defining means including a flow path defining flow path tube unit (1), said flow path tube unit (1) surrounding said cylinder member (5) and cooperating with said cylinder member (5) to define radially between said cylinder member (5) and said flow path tube unit (1) a fluid flow chamber (14) having a radial height (h2), said flow path tube unit (1) having axially spaced flow path tube end portions (21), said flow path tube unit (1) having at least one transverse joint tube member (18) extending substantially radially outward from said flow path tube unit (1) and being adapted to be adjoined to said at least one damping behavior control unit (15), said at least one flow path tube end portion (21) comprising a sealing means receiving groove (22a) having a radial depth (h1), said sealing means receiving groove (22a) accommodating annular sealing means for substantially sealing said fluid flow chamber (14), said at least one flow path tube end portion (21) being an integral portion of a tube section (20) of said flow path tube unit (1) and being formed by cold-shaping without swarf-cutting of the sealing means receiving groove (22a), said sealing means receiving groove (22a) being located in said flow path tube end portion (21) in an axially intermediate area of said flow path tube end portion (21), said axially intermediate area (21a) of said flow path tube end portion (21) being located axially between a terminal area (21b) of said flow path tube end portion (21) and a transition area (21c) of said flow path tube end portion (21), said transition area (21c) being coherent with said adjacent tube portion (21') by a shoulder portion (21d), said flow path tube end portion (21) having in said transition area (21c) and in said terminal area (21b) respective internal diameters (Dbci) corresponding to an external diameter (De) of an external engagement face (5e) of one of said cylinder member (5), said piston rod sealing and guiding unit (11) and said bottom unit (10), the wall thicknesses (t21c, t21b, t21a) in said transition area (21c), said terminal area (21b) and said axially intermediate area (21a), being substantially equal to the wall thickness (t21') of an adjacent portion of said portion (21') of said tube section (20), said axially intermediate area (21a) having an outer diameter (Dao) larger than respective outer diameters (Dbco) of said transition area (21c) and said terminal area (21b), said shoulder portion (21d) having a radial height (h2) substantially corresponding to said radial height (h2) of said fluid flow chamber (14), said transverse joint tube member (18) being integral with a longitudinal section of said flow path tube unit (1).

44. A vibration damper unit, the damping behavior of which is variable through at least one damping behavior control unit (15), said vibration damper unit comprising a cylinder member (5) having an axis (A-A) and two ends and defining a cavity (5a) therein, a piston rod member (6) sealingly guided through at least one of said two ends, a piston rod guiding and sealing unit (11) adjacent said at least one of said two ends, a bottom unit (10) adjacent the other one of said two ends, a piston unit (9) combined with said piston rod member (6) within said cavity (5a), a plurality of spaces (8, 8a, 14, 16) inside and outside said cavity (5a), a damping fluid within at least part of said spaces, flow path defining means defining flow paths interconnecting respective spaces, at least one (17, 14, 15a, 16) of said flow paths containing said at least one damping behavior control unit (15), said flow path defining means including a flow path defining flow path tube unit (1), said flow path tube unit (1) surrounding said cylinder member (5) and cooperating with said cylinder member (5) to define radially between said cylinder member (5) and said flow path tube unit (1) a fluid flow chamber (14), said flow path tube unit (1) having at least one flow path tube end portion (21), said flow path tube unit (1) having at least one transverse joint tube member (18) extending substantially radially outward from said flow path tube unit (1) and being adapted to be adjoined to said at least one damping behavior control unit (15), said at least one flow path tube end portion (21) comprising a sealing means receiving groove (22a), said sealing means receiving groove (22a) accommodating annular sealing means for substantially sealing said fluid flow chamber (14), said flow path tube unit (101) comprising a plurality of at least two axially extending flow path tube sections (101a, 101b), which are sealingly engaged with each other and substantially stationary with respect to each other in operation of said vibration damper unit, said mutually adjacent flow path tube sections (101a, 101b) of said flow path tube unit (101) having axially overlapping telescopically related connecting portions (24a, 24b), said mutually overlapping connecting portions (24a, 24b) being provided with respective coacting abutment means (24b2, 24a1) defining a position of maximum overlapping (26) between said mutually overlapping connecting portions (24a, 24b).

45. A vibration damper unit, the damping behavior of which is variable through at least one damping behavior control unit (15), said vibration damper unit comprising a cylinder member (5) having an axis (A-A) and two ends and defining a cavity (5a) therein, a piston rod member (6) sealingly guided through at least one of said two ends, a piston rod guiding and sealing unit (11) adjacent said at least one of said two ends, a bottom unit (10) adjacent the other one of said two ends, a piston unit (9) combined with said piston rod member (6) within said cavity (5a), a plurality of spaces (8, 8a, 14, 16) inside and outside said cavity (5a), a damping fluid within at least part of said spaces, flow path defining means defining flow paths interconnecting respective spaces, at least one (17, 14, 15a, 16) of said flow paths containing said at least one damping behavior control unit (15), said flow path defining means including a flow path defining flow path tube unit (1), said flow path tube unit (1) surrounding said cylinder member (5) and cooperating with said cylinder member (5) to define radially between said cylinder member (5) and said flow path tube unit (1) a fluid flow chamber (14), said flow path tube unit (1) having axially spaced flow path tube end portions (21), said flow path tube unit (1) having at least one transverse joint tube member (18) extending substantially radially outward from said flow path tube unit (1) and being adapted to be adjoined to said at least one damping behavior control unit (15), said flow path tube unit (101) comprising a plurality of at least two axially flow path tube sections (101a, 101b), which are sealingly engaged with each other and substantially stationary with respect to each other in operation of said vibration damper unit, said mutually adjacent flow path tube sections (101a, 101b) of said flow path tube unit (101) having axially overlapping telescopically related connecting portions (24a, 24b), said mutually overlapping connecting portions (24a, 24b) being provided with respective coacting abutment means (24b2, 24a1) defining a position of maximum overlapping (26) between said mutually overlapping connecting portions (24a, 24b).

46. A vibration damper unit, the damping behavior of which is variable through at least one damping behavior control unit (15), said vibration damper unit comprising a cylinder member (5) having an axis (A-A) and two ends and defining a cavity (5a) therein, a piston rod member (6) sealingly guided through at least one of said two ends, a piston rod guiding and sealing unit (11) adjacent said at least one of said two ends, a bottom unit (10) adjacent the other one of said two ends, a piston unit (9) combined with said piston rod member (6) within said cavity (5a), a plurality of spaces (8, 8a, 14, 16) inside and outside said cavity (5a), a damping fluid within at least part of said spaces, flow path defining means defining flow paths interconnecting respective spaces, at least one (17, 14, 15a, 16) of said flow paths containing said at least one damping behavior control unit (15), said flow path defining means including a flow path defining flow path tube unit (1), said flow path tube unit (1) surrounding said cylinder member (5) and cooperating with said cylinder member (5) to define radially between said cylinder member (5) and said flow path tube unit (1) a fluid flow chamber (14), said flow path tube unit (1) having axially spaced flow path tube end portions (21) and comprising a plurality of at least two axially adjacent flow path tube sections (101a, 101b), which are sealingly engaged with each other, at least two of said plurality of flow path tube sections being rotatable relative to each other, said flow path tube unit (1) being provided with a plurality of at least two transverse joint tube members (18) extending substantially radially outward from said flow path tube unit (1) and being adapted to be adjoined to a damping behavior control unit (15), at least one of the two flow path tube sections (102a, 101b) which are rotatable with respect to each other being provided with at least one respective transverse joint tube member (18).

47. A vibration damper unit, the damping behavior of which is variable through at least one damping behavior control unit (15), said vibration damper unit comprising a cylinder member (5) having an axis (A-A) and two ends and defining a cavity (5a) therein, a piston rod member (6) sealingly guided through at least one of said two ends, a piston rod guiding and sealing unit (11) adjacent said at least one of said two ends, a bottom unit (10) adjacent the other one of said two ends, a piston unit (9) combined with said piston rod member (6) within said cavity (5a), a plurality of spaces (8, 8a, 14, 16) inside and outside said cavity (5a), a damping fluid within at least part of said spaces, flow path defining means defining flow paths interconnecting respective spaces, at least one (17, 14, 15a, 16) of said flow paths containing said at least one damping behavior control unit (15), said flow path defining means including a flow path defining flow path tube unit (1), said flow path tube unit (1) surrounding said cylinder member (5) and cooperating with said cylinder member (5) to define radially between said cylinder member (5) and said flow path tube unit (1) a fluid flow chamber (14), said flow path tube unit (1) having axially spaced flow path tube end portions (21), said flow path tube unit (1) having at least one transverse joint tube member (18) extending substantially radially outward from said flow path tube unit (1) and being adapted to be adjoined to said at least one damping behavior control unit (15), said flow path tube unit (101) comprising two separate terminal flow path tube sections (201a, 201b) and one separate intermediate flow path tube section (201c) axially therebetween which are sealingly engaged with each other and substantially stationary with respect to each other in Operation of said vibration damper unit.

48. A vibration damper unit, the damping behavior of which is variable through at least one damping behavior control unit (15), said vibration damper unit comprising a cylinder member (5) having an axis (A-A) and two ends and defining a cavity (5a) therein, a piston rod member (6) sealingly guided through at least one of said two ends, a piston rod guiding and sealing unit (11) adjacent said at least one of said two ends, a bottom unit (10) adjacent the other one of said two ends, a piston unit (9) combined with said piston rod member (6) within said cavity (5a), a plurality of spaces (8, 8a, 14, 16) inside and outside said cavity (5a), a damping fluid within at least part of said spaces, flow path defining means defining flow paths interconnecting respective spaces, at least one (17, 14, 15a, 16) of said flow paths containing said at least one damping behavior control unit (15), said flow path defining means including a flow path defining flow path tube unit (1), said flow path tube unit (1) surrounding said cylinder member (5) and cooperating with said cylinder member (5) to define radially between said cylinder member (5) and said flow path tube unit (1) a fluid flow chamber (14), said flow path tube unit (1) having axially spaced flow path tube end portions (21), said flow path tube unit (1) having at least one transverse joint tube member (18) extending substantially radially outward from said flow path tube unit (1) and being adapted to be adjoined to said at least one damping behavior control unit (15), said flow path tube unit (101) comprising a plurality of at least two axially adjacent flow path tube sections (101a, 101b), at least one of said flow path tube sections (101a, 101b) being rotatable with respect to a respective adjacent flow path tube section (101b, 101a) about said axis (A-A), mutually adjacent flow path tube sections (101a, 101b) of said flow path tube unit (101) having axially overlapping connecting portions (24a, 24b), said axially overlapping connecting portions (24a, 24b) being in mutual threaded engagement (27) and sealingly engaged with each other and substantially stationary with respect to each other in operation of said vibration damper unit.

* * * * *

UNITED STATES PATENT AND TRADEMARK OFFICE
CERTIFICATE OF CORRECTION

PATENT NO. : 5,353,898
DATED : October 11, 1994
INVENTOR(S) : Handke et al.

It is certified that error appears in the above-indentified patent and that said Letters Patent is hereby corrected as shown below:

Title page, Item [30], third line, "9206586[U]" should read --9206568[U]--;
Col. 5, line 27, "adjacent: outer" should read --adjacent outer--;
Col. 8, line 33, "Surface" should read --surface--;
Col. 14, line 47, "claim 10" should read --claim 9--;
Col. 20, line 60, "axially" should read --axially extending--;
Col. 22, lines 15-16, "Operation" should read --operation--

Signed and Sealed this

Seventh Day of March, 1995

Attest:

BRUCE LEHMAN

Attesting Officer          Commissioner of Patents and Trademarks